United States Patent
Hancock et al.

(10) Patent No.: US 11,352,452 B2
(45) Date of Patent: Jun. 7, 2022

(54) ARTICLES AND METHODS RELATED TO LABILE CROSSLINKING MOIETIES

(71) Applicant: Akita Innovations LLC, Billerica, MA (US)

(72) Inventors: Lawrence F. Hancock, North Andover, MA (US); Richard A. Minns, Arlington, MA (US)

(73) Assignee: Akita Innovations LLC, Billerica, MA (US)

( * ) Notice: Subject to any disclaimer, the term of this patent is extended or adjusted under 35 U.S.C. 154(b) by 0 days.

(21) Appl. No.: 16/997,837

(22) Filed: Aug. 19, 2020

(65) Prior Publication Data

US 2022/0056218 A1 Feb. 24, 2022

(51) Int. Cl.
| | |
|---|---|
| *C08F 8/50* | (2006.01) |
| *C08F 130/08* | (2006.01) |
| *C08G 77/38* | (2006.01) |
| *C08F 228/02* | (2006.01) |
| *C08F 230/08* | (2006.01) |

(52) U.S. Cl.
CPC .............. *C08F 8/50* (2013.01); *C08F 130/08* (2013.01); *C08F 228/02* (2013.01); *C08F 230/08* (2013.01); *C08G 77/38* (2013.01)

(58) Field of Classification Search
None
See application file for complete search history.

(56) References Cited

FOREIGN PATENT DOCUMENTS

| | | | |
|---|---|---|---|
| CN | 104914675 | A | 9/2015 |
| JP | 5-255349 | * | 10/1993 |
| WO | WO 86/00084 | A1 | 1/1986 |
| WO | WO 2019/129560 | A1 * | 7/2021 |

OTHER PUBLICATIONS

Young's modulus data for p(hydroxyethyl methacrylate) taken from https://poly.chemnetbase.com/faces/polymers/PolymerSearchResults.xhtml.*
"Synthesis and Characterization of Star Polymers and Cross-linked Star Polymer Model Networks containing a Novel, Silicon-based, Hydrolyzable Cross-linker" authored by Themistou et al. and published in Macromolecules (2004) 37, 6734-6743.*
"Vat Polymerization 3D Printing of Acid-cleavable PEG-methacrylate Networks for Biomaterial Applications" authored by Aduba et al. and published in Materials Today Communications (2019) 19, 204-211.*
"Tunable Bifunctional Silyl Ether Cross-linkers for the Design of Acid-Sensitive Biomaterials" authored by Parrott et al. and published in JACS (2010) 132, 17928-17932.*
"Degradable Silyl Ether-containing Networks from Trifunctional Thiols and Acrylates" authored by Bunton et al. and published in Macromolecules (2020) 53, 9890-9900.*
Parrott et al., Tunable bifunctional silyl ether cross-linkers for the design of acid-sensitive biomaterials. J Am Chem Soc. Dec. 22, 2010;132(50):17928-32. doi: 10.1021/ja108568g. Epub Nov. 24, 2010. Supporting Information.
Shieh et al., Cleavable comonomers enable degradable, recyclable thermoset plastics. Nature. Jul. 2020;583(7817):542-547. doi: 10.1038/s41586-020-2495-2. Epub Jul. 22, 2020.
Wang et al., Synthesis, characterization, and UV-curing properties of silicon-containing (Meth)acrylate monomers. J Appl Polym Sci. Sep. 15, 2013;129(6):3325-32.

\* cited by examiner

*Primary Examiner* — Marc S Zimmer

(74) *Attorney, Agent, or Firm* — Wolf, Greenfield & Sacks, P.C.

(57) ABSTRACT

Articles and methods related to the manufacture of polymers containing labile crosslinking moieties are generally described.

14 Claims, 3 Drawing Sheets

ARTICLES AND METHODS RELATED TO LABILE CROSSLINKING MOIETIES

GOVERNMENT SPONSORSHIP

This invention was made with Government support under Grant No. W911SR-18-P-0022, awarded by the Small Business Innovation Research program. The Government has certain rights to this invention.

TECHNICAL FIELD

Articles and methods related to the manufacture of polymers containing labile crosslinking moieties are generally described.

BACKGROUND

High-resolution additive manufacturing (e.g., three-dimensional (3D) printing) requires that the material being manufactured be strong enough to support its own weight. Otherwise, the material will bend during manufacture, making it expensive and/or labor intensive to maintain precision and accuracy as new material is continuously added to what has already been manufactured. Some additive manufacturing technologies utilize sacrificial supports to reduce or eliminate bending of a material during the manufacturing process. Sacrificial supports, however, require the deposition of at least two substances—the support itself and the material—therefore adding complexity and cost to the overall manufacturing process. Another additive manufacturing process known as vat photopolymerization utilizes a liquid photopolymer contained in a vat, which is selectively cured layer by layer until the 3D material is generated. Vat photopolymerization, however, is a wasteful process since it requires a large excess of materials, which must be furthermore cleaned from the object after the manufacture process is complete. Accordingly, improved articles and methods related to additive manufacturing are needed.

SUMMARY

Articles and methods related to the manufacture of polymers containing labile crosslinking moieties are generally described. The subject matter of the present invention involves, in some cases, interrelated products, alternative solutions to a particular problem, and/or a plurality of different uses of one or more systems and/or articles.

According to certain embodiments, a method is described, the method comprising providing a structurally self-supporting material comprising a polymeric material crosslinked by a plurality of crosslinking moieties and exposing at least a portion of the structurally self-supporting material to $H_2O$, thereby reacting at least a portion of the crosslinking moieties and converting at least a portion of the structurally self-supporting material to a non-structurally self-supporting material.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
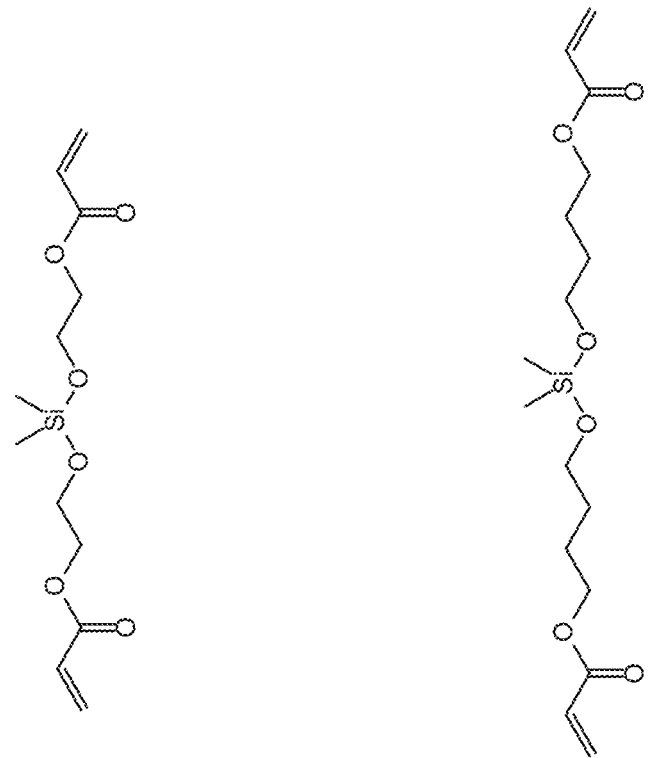
FIG. 1A shows, according to certain embodiments, a synthetic scheme to produce bis-oxyethylacrylate dimethylsilane.

Articles and methods related to materials that can vary in their structurally self-supporting properties are generally described. In some embodiments, the articles and methods described herein provide materials and techniques for affecting the structurally self-supporting properties of a material. For example, in certain embodiments, a material may be provided and/or treated in such a way that makes the material structurally self-supporting, followed by providing and/or treating the material in a different way that makes the material non-structurally self-supporting. In some embodiments, a material (e.g., a polymer) may contain a plurality of stable crosslinks, and a plurality of labile crosslinking moieties that control whether the material is structurally self-supporting. The polymer formulations and processes described herein overcome certain deficiencies in conventional methods of additive manufacturing (e.g., high resolution additive manufacturing) by providing polymeric materials that are capable of being either structurally self-supporting (e.g., rigid polymers) or non-structurally self-supporting (e.g., elastomers), and in some embodiments, both at least partially structurally self-supporting and at least partially non-structurally self-supporting.

As used herein, the phrase "structurally self-supporting" means a material strong enough to support its own weight over a maximum dimension of the material when the material is suspended from one end under the force of earth's gravity. Alternatively, the phrase "non-structurally self-supporting," as used herein, means a material not strong enough to support its own weight over the maximum dimension of the material when the material is suspended from one end under the force of earth's gravity, therefore leading to a distortion in the material (such as, for example, a sag, bend, flop, curve, twist, and the like).

The following aspects can be found alone, or in combination, in various embodiments and arrangements. That is, each of the following aspects can be provided alone, and/or any combination of any number of the following aspects can be provided in combination, in various embodiments described herein.

In some embodiments, a modified polymer formulation is described. The modified polymer formulation may be a structurally self-supporting material comprising a polymeric material (e.g., an acrylate polymer) crosslinked by a plurality of crosslinking moieties. The structurally self-supporting material may be provided by additive manufacturing techniques (e.g., 3D printing). In certain embodiments, the plurality of crosslinking moieties at least partially enables additive manufacturing of the structurally self-supporting material, for example, as a rigid structure with dimensional stability. For example, in some embodiments, the plurality of crosslinking moieties allow the polymeric material to support its own weight over a maximum dimension of the material when the material is suspended from one end under the force of earth's gravity, such that the material does not distort. In this way, during manufacturing, the polymeric material may be continuously added to what has already been manufactured since the material can support its own weight.

According to certain embodiments, the plurality of crosslinking moieties may be reactive (e.g., hydrolytically reactive) crosslinking moieties. For example, in some embodiments, a crosslinking moiety comprises a silyl-ether acrylate, which may be, in some embodiments, reactive and/or labile. As used herein, the term "labile" is given its ordinary meaning in the art and generally refers to a moiety that is stable under ambient conditions, but prone to certain reactivity such that at least a portion of the moiety may become fragmented or severed as a result of such reactivity.

In some embodiments, the rigid structurally self-supporting material comprising a polymeric material crosslinked by a plurality of crosslinking moieties can be treated after the additive manufacturing process (e.g., post-treated) to react the crosslinking moieties without reacting the stable crosslinks. As a result of the post-treatment, at least a portion of the previously rigid structure may be rendered non-structurally self-supporting. For example, in some embodiments, the structurally self-supporting material may be exposed to $H_2O$ (e.g., liquid water and/or gaseous water), resulting in hydrolysis of at least a portion of the plurality of crosslinking moieties. In a non-limiting embodiment, at least a portion of the silyl-ether acrylates are hydrolyzed as a result of exposing the rigid, structurally self-supporting material to $H_2O$, therefore resulting in a non-structurally self-supporting material comprising a polymeric material comprising, for example, a hydroxy-functionalized polyacrylate with stable polyacrylate crosslinks.

In certain embodiments, as a result of exposing the structurally self-supporting materials to $H_2O$, substantially all of the plurality of crosslinking moieties are hydrolyzed without reacting the stable crosslinks, thereby resulting in a hydroxy-functionalized polyacrylate with stable polyacrylate crosslinks.

An additional embodiment described herein is the controlled reactivity of the crosslinking moieties. In some embodiments, for example, the crosslink density of the structurally self-supporting material may be fine-tuned by exposing the structurally self-supporting material to $H_2O$ for certain periods of time. Without wishing to be bound by theory, exposing the structurally self-supporting material to $H_2O$ for longer periods of time may result in an increased reduction in crosslink density as compared to, for example, shorter periods of time. Resultantly, the degree of crosslinking in the non-structurally self-supporting materials may be fine-tuned to provide elastomers with varying degrees of pliability by exposing the structurally self-supporting material to water for a sufficient amount of time.

In certain embodiments, the crosslink density of the structurally self-supporting material may be fine-tuned by exposing the structurally self-supporting material to $H_2O$ at certain temperatures. Without wishing to be bound by theory, exposing the structurally self-supporting material to $H_2O$ at higher temperatures may result in an increased reduction in crosslink density as compared to, for example, lower temperatures. Resultantly, the degree of crosslinking in the non-structurally self-supporting materials may be fine-tuned to provide elastomers with varying degrees of pliability by exposing the structurally self-supporting material to water at a sufficient temperatures.

Non-structurally self-supporting materials are typically manufactured by processes other than additive manufacturing (e.g., high resolution additive manufacturing), since it is expensive and/or labor intensive to maintain precision and accuracy as new material is manufactured onto the already existing non-structurally self-supporting material. Therefore, in order to provide non-structurally self-supporting materials by additive manufacturing techniques, conventional technologies utilize either expensive and complex support materials or wasteful manufacturing processes that require a large excess of materials. As described herein, however, the polymeric material and associated processes may be utilized to provide a rigid, structurally self-supporting material by, for example, inexpensive additive manufacturing processes, such as 3D printing. The structurally self-supporting material may then be converted, in some embodiments, to a cohesive and non-structurally self-supporting material as a result of exposing the material to, for example, $H_2O$, therefore providing softening of the initially rigid material.

Certain embodiments described herein are related to a structurally self-supporting material that comprises a polymeric material crosslinked by a plurality of crosslinking moieties. The plurality of crosslinking moieties may advantageously provide the structurally self-supporting material with rigidity. For example, in certain embodiments, the plurality of crosslinking moieties render the material structurally self-supporting, such that the material is strong enough to support its own weight over a maximum dimension of the material (e.g., when the material is suspended from one end under the force of earth's gravity). In some embodiments, the structurally self-supporting materials may be provided and/or processed by additive manufacturing without issues related to maintaining precision and accuracy as new material is manufactured onto the already existing rigid, structurally self-supporting material.

According to some embodiments, as described above, each of the crosslinking moieties may be or comprise a silyl-ether acrylate. In certain embodiments, for example, the crosslinking moiety comprises an acrylate, such as, but not limited to methyl acrylate, ethyl acrylate, propyl acrylate, butyl acrylate, methyl methacrylate, ethyl methacrylate, propyl methacrylate, butyl methacrylate, and/or derivatives thereof. Other acrylates are also possible.

In certain embodiments, each of the crosslinking moieties may comprise a diacrylate, triacrylate, tetraacrylate, and the like.

According to some embodiments, each of the crosslinking moieties may be or comprise a silyl-ether diacrylate of the structure:

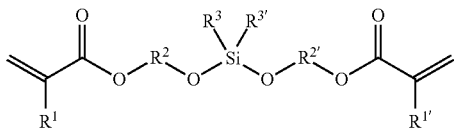

wherein:

R$^1$ and R$^{1'}$ are the same or different and are selected from the group consisting of —H, —CH$_3$, C$_{1-10}$ alkyl, heteroalkyl, alkenyl, heteroalkenyl, alkynyl, heteroalkynyl, acyl, carbocyclyl, heterocyclyl, aryl, heteroaryl, halo, hydroxyl, thiol, amino, carbonyl, and combinations thereof;

R$^2$ and R$^{2'}$ are the same or different and are selected from the group consisting of C$_{1-10}$ alkyl, heteroalkyl, alkenyl, heteroalkenyl, alkynyl, heteroalkynyl acyl, carbocyclyl, heterocyclyl, aryl, heteroaryl, and combinations thereof; and R$^3$ and R$^{3'}$ are the same or different and are selected from the group consisting of —H, —CH$_3$, C$_{1-10}$ alkyl, heteroalkyl, alkenyl, heteroalkenyl, alkynyl, heteroalkynyl, acyl, carbocyclyl, heterocyclyl, aryl, heteroaryl, halo, hydroxyl, thiol, amino, carbonyl, and combinations thereof.

In certain embodiments, R$^1$ and R$^{1'}$ are the same and are —H or —CH$_3$, R$^2$ and R$^{2'}$, are the same and are —CH$_2$—, —CH$_2$—CH$_2$—, —CH$_2$—CH$_2$—CH$_2$—, or —CH$_2$—CH$_2$—CH$_2$—CH$_2$—, and/or R$^3$ and R$^{3'}$ are the same and are —CH$_3$.

According to certain non-limiting embodiments, each of the crosslinking moieties are bis-oxyethylacrylate dimethylsilane of the structure:

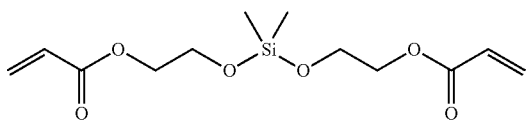 [SMILES: C=CC(=O)OCCO[Si](C)(C)OCCOC(=O)C=C]

According to other certain non-limiting embodiments, each of the crosslinking moieties are bis-oxybutylacrylate dimethylsilane of the structure:

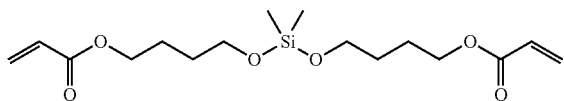 [SMILES: C=CC(=O)OCCCCO[Si](C)(C)OCCCCOC(=O)C=C]

According to some embodiments, each of the crosslinking moieties may be or comprise a silyl-ether triacrylate of the structure:

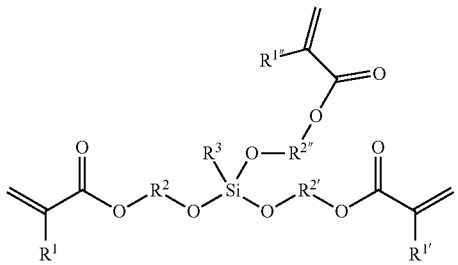

wherein:

any of R$^1$, R$^{1'}$, and R$^{1''}$ are the same or different and are selected from the group consisting of —H, —CH$_3$, C$_{1-10}$ alkyl, heteroalkyl, alkenyl, heteroalkenyl, alkynyl, heteroalkynyl, acyl, carbocyclyl, heterocyclyl, aryl, heteroaryl, halo, hydroxyl, thiol, amino, carbonyl, and combinations thereof;

any of R$^2$, R$^{2'}$, and R$^{2''}$ are the same or different and are selected from the group consisting of C$_{1-10}$ alkyl, heteroalkyl, alkenyl, heteroalkenyl, alkynyl, heteroalkynyl acyl, carbocyclyl, heterocyclyl, aryl, heteroaryl, and combinations thereof; and R$^3$ is selected from the group consisting of —H, —CH$_3$, C$_{1-10}$ alkyl, heteroalkyl, alkenyl, heteroalkenyl, alkynyl, heteroalkynyl, acyl, carbocyclyl, heterocyclyl, aryl, heteroaryl, halo, hydroxyl, thiol, amino, carbonyl, and combinations thereof.

According to certain non-limiting embodiments, each of the crosslinking moieties are tris-oxyethylacrylate methylsilane of the structure:

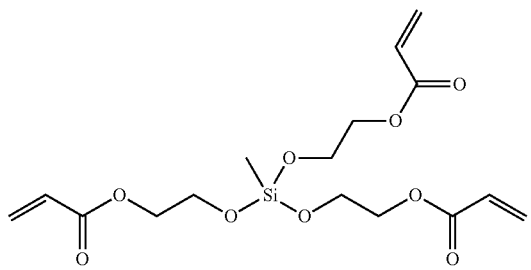 [SMILES: C=CC(=O)OCCO[Si](C)(OCCOC(=O)C=C)OCCOC(=O)C=C]

According to other certain non-limiting embodiments, each of the crosslinking moieties are tris-oxybutylacrylate methylsilane of the structure:

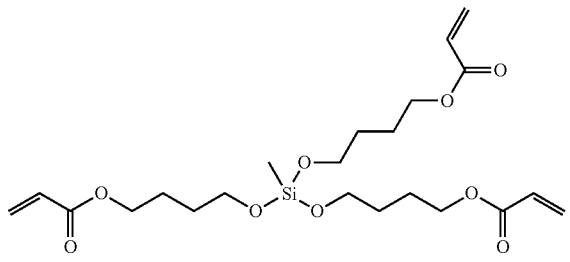 [SMILES: C=CC(=O)OCCCCO[Si](C)(OCCCCOC(=O)C=C)OCCCCOC(=O)C=C]

In some embodiments, each of the crosslinking moieties may be or comprise a silyl-ether tetraacrylate of the structure:

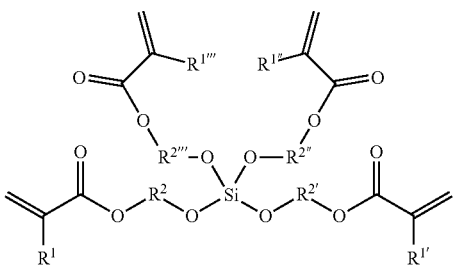

wherein:
any of $R^1$, $R^{1\prime}$, $R^{1\prime\prime}$, and $R^{1\prime\prime\prime}$ are the same or different and are selected from the group consisting of —H, —CH$_3$, C$_{1-10}$ alkyl, heteroalkyl, alkenyl, heteroalkenyl, alkynyl, heteroalkynyl, acyl, carbocyclyl, heterocyclyl, aryl, heteroaryl, halo, hydroxyl, thiol, amino, carbonyl, and combinations thereof; and any of $R^2$, $R^{2\prime}$, $R^{2\prime\prime}$, and $R^{2\prime\prime\prime}$ are the same or different and are selected from the group consisting of C$_{1-10}$ alkyl, heteroalkyl, alkenyl, heteroalkenyl, alkynyl, heteroalkynyl acyl, carbocyclyl, heterocyclyl, aryl, heteroaryl, and combinations thereof.

According to certain non-limiting embodiments, each of the crosslinking moieties are tetra-oxyethylacrylate silane of the structure:

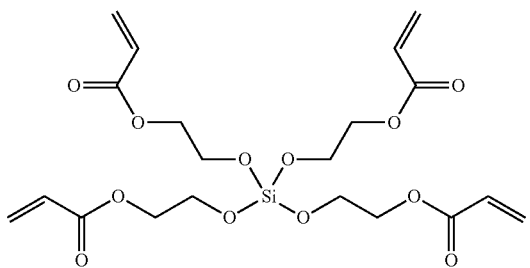 [SMILES: C=CC(=O)OCCO[Si](OCCOC(=O)C=C)(OCCOC(=O)C=C)OCCOC(=O)C=C]

According to other certain non-limiting embodiments, each of the crosslinking moieties are tetra-oxybutylacrylate silane of the structure:

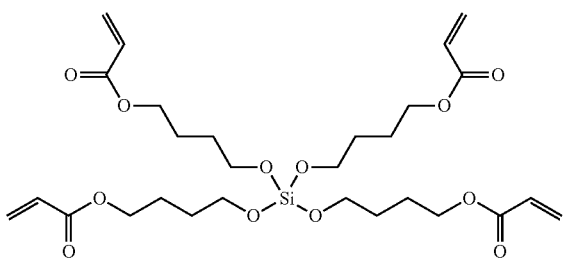 [SMILES: C=CC(=O)OCCCCO[Si](OCCCCOC(=O)C=C)(OCCCCOC(=O)C=C)OCCCCOC(=O)C=C]

In certain embodiments, the plurality of crosslinking moieties may be provided (e.g., synthesized) by a person of ordinary skill in the art. For example, in some embodiments, the plurality of crosslinking moieties may be synthesized by reacting the commercially available acrylate alcohols with chlorosilanes. In some embodiments, the reaction may be performed in a single step and on a large scale (e.g., at least 50 grams of product may be synthesized). Therefore, advantageously, the reaction to provide the plurality of crosslinking moieties is inexpensive, efficient, and scalable.

As would be understood by a person of ordinary skill in the art, the silyl-ether diacrylate, silyl-ether triacrylates, and silyl-ether tetraacrylates represented by the structures above are the crosslinking moieties prior to polymerization to form the polymeric material, which is explained in further detail below.

According to some embodiments, the structurally self-supporting material may comprise a polymeric material crosslinked by the plurality of crosslinking moieties. For example, in certain embodiments, each of the crosslinking moieties described above may be crosslinked and/or polymerized, thereby providing the polymeric material. As used herein, the term "crosslink" or "polymerize" refers to a chemical reaction between two or more similar or dissimilar monomers, polymers, copolymers, oligomers, and/or macromers that links the two or more similar or dissimilar monomers, polymers, copolymers, oligomers, and/or macromers via formation of at least one covalent bond and/or ionic bond, or a chain extension between one or more monomers, polymers, copolymers, oligomers, and/or macromers to provide a longer chain of the one or more monomers, polymers, copolymers, oligomers, and/or macromers via formation of at least one covalent bond and/or ionic bond.

In certain embodiments, each of the crosslinking moieties may be crosslinked and/or polymerized by, for example, free-radical polymerization. Concepts and techniques related to free-radical polymerization would be generally understood by a person of ordinary skill in the art. In certain embodiments, for example, free-radical polymerization of the crosslinking moieties may be initiated by photopolymerization (e.g., with UV light). As a result of polymerizing the plurality of crosslinking moieties (e.g., the plurality of silyl-ether acrylates), for example, a polymeric material (e.g., a silyl-ether acrylate polymer) may be provided. According to some embodiments, each of the crosslinking moieties crosslink with each other to provide the polymeric material.

In certain embodiments, for example, the structurally self-supporting material comprises a polymeric material crosslinked by a plurality of crosslinking moieties, such as a silyl-ether diacrylate polymer of the structure:

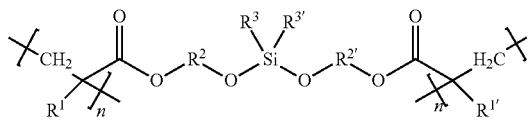

wherein:
$R^1$ and $R^{1\prime}$ are the same or different and are selected from the group consisting of —H, —CH$_3$, C$_{1-10}$ alkyl, heteroalkyl, alkenyl, heteroalkenyl, alkynyl, heteroalkynyl, acyl, carbocyclyl, heterocyclyl, aryl, heteroaryl, halo, hydroxyl, thiol, amino, carbonyl, and combinations thereof;

$R^2$ and $R^{2\prime}$ are the same or different and are selected from the group consisting of C$_{1-10}$ alkyl, heteroalkyl, alkenyl, heteroalkenyl, alkynyl, heteroalkynyl acyl, carbocyclyl, heterocyclyl, aryl, heteroaryl, and combinations thereof;

$R^3$ and $R^{3\prime}$ are the same or different and are selected from the group consisting of —H, —CH$_3$, C$_{1-10}$ alkyl, heteroalkyl, alkenyl, heteroalkenyl, alkynyl, heteroalkynyl, acyl, carbocyclyl, heterocyclyl, aryl, heteroaryl, halo, hydroxyl, thiol, amino, carbonyl, and combinations thereof; and n is greater than or equal to 2.

Without wishing to be bound by theory, in some embodiments, the degree of polymerization of the silyl-ether acrylate polymer (e.g., the upper limit of n) may greater than or equal to 100,000, greater than or equal to 200,000, greater than or equal to 300,000, greater than or equal to 400,000, greater than or equal to 500,000, greater than or equal to 600,000, greater than or equal to 700,000, greater than or equal to 800.000, or greater than or equal to 900,000. In certain embodiments, the degree of polymerization of the silyl-ether acrylate polymer may be less than or equal to 1,000,000, less than or equal to 900,000, less than or equal to 800,000, less than or equal to 700,000, less than or equal to 600,000, less than or equal to 500,000, less than or equal to 400,000, less than or equal to 300,000, or less than or equal to 200,000. Combinations of the above recited ranges are also possible (e.g., the degree of polymerization of the silyl-ether acrylate polymer may be greater than or equal to 100,000 and less than or equal to 1,000,000, the degree of polymerization of the silyl-ether acrylate polymer may be greater than or equal to 500,000 and less than or equal to 700,000). Other ranges are also possible. Methods of determining the degree of polymerization would be understood by one of ordinary skill in the art. In some embodiments, for example, the degree of polymerization is determined by dividing the molecular weight of the polymer by the molecular weight of the monomer unit.

According to certain non-limiting embodiments, the polymeric material comprises a bis-oxyethylacrylate dimethylsilane polymer of the structure:

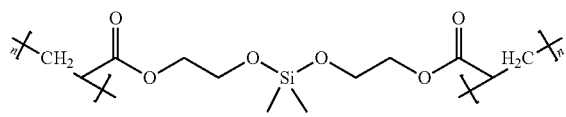

wherein:
n is greater than or equal to 2.

According to other certain non-limiting embodiments, the polymeric material comprises a bis-oxybutylacrylate dimethylsilane polymer of the structure:

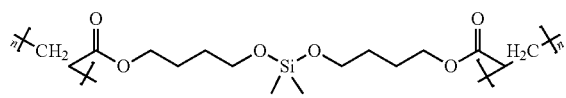

wherein:
n is greater than or equal to 2.

In certain embodiments, the structurally self-supporting material comprises a silyl-ether triacrylate polymer of the structure:

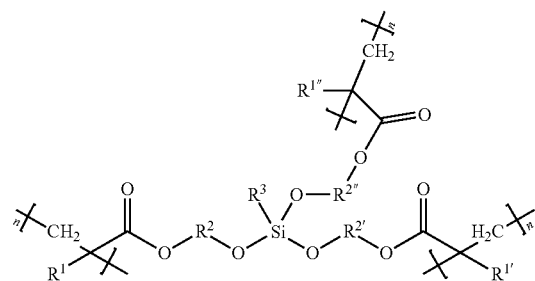

wherein:
any of $R^1$, $R^{1\prime}$, and $R^{1\prime\prime}$ are the same or different and are selected from the group consisting of —H, —CH$_3$, $C_{1-10}$ alkyl, heteroalkyl, alkenyl, heteroalkenyl, alkynyl, heteroalkynyl, acyl, carbocyclyl, heterocyclyl, aryl, heteroaryl, halo, hydroxyl, thiol, amino, carbonyl, and combinations thereof;
any of $R^2$, $R^{2\prime}$, and $R^{2\prime\prime}$ are the same or different and are selected from the group consisting of $C_{1-10}$ alkyl, heteroalkyl, alkenyl, heteroalkenyl, alkynyl, heteroalkynyl acyl, carbocyclyl, heterocyclyl, aryl, heteroaryl, and combinations thereof;

$R^3$ is selected from the group consisting of —H, —CH$_3$, $C_{1-10}$ alkyl, heteroalkyl, alkenyl, heteroalkenyl, alkynyl, heteroalkynyl, acyl, carbocyclyl, heterocyclyl, aryl, heteroaryl, halo, hydroxyl, thiol, amino, carbonyl, and combinations thereof; and
n is greater than or equal to 2.

According to certain non-limiting embodiments, the polymeric material comprises a tris-oxyethylacrylate methylsilane polymer of the structure:

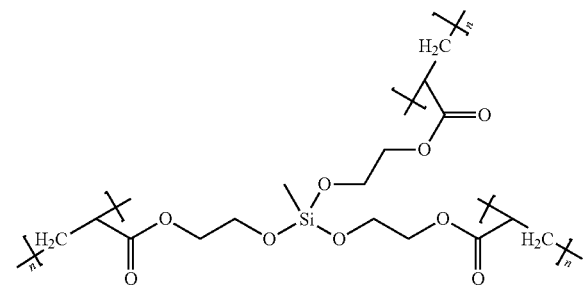

wherein:
n is greater than or equal to 2.

According to other certain non-limiting embodiments, the polymeric material comprises a tris-oxybutylacrylate methylsilane polymer of the structure:

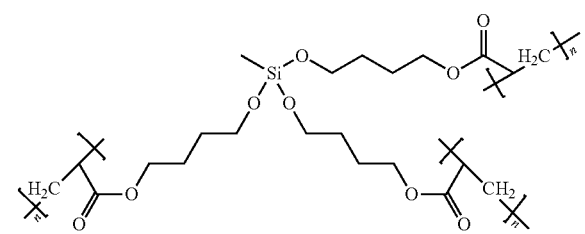

wherein:
n is greater than or equal to 2.

In some embodiments, the structurally self-supporting material comprises a silyl-ether tetraacrylate polymer of the structure:

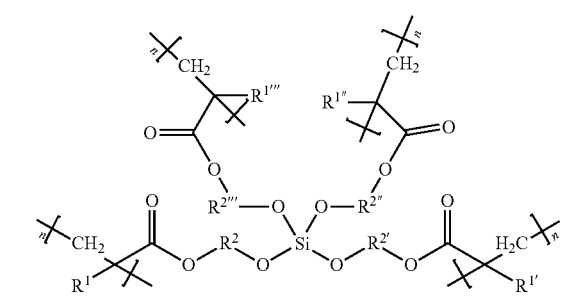

wherein:
any of $R^1$, $R^{1\prime}$, $R^{1\prime\prime}$, and $R^{1\prime\prime\prime}$ are the same or different and are selected from the group consisting of —H, —CH$_3$, $C_{1-10}$ alkyl, heteroalkyl, alkenyl, heteroalkenyl, alkynyl, heteroalkynyl, acyl, carbocyclyl, heterocyclyl, aryl, heteroaryl, halo, hydroxyl, thiol, amino, carbonyl, and combinations thereof;

any of $R^2$, $R^{2\prime}$, $R^{2\prime\prime}$, and $R^{2\prime\prime\prime}$ are the same or different and are selected from the group consisting of $C_{1-10}$ alkyl, heteroalkyl, alkenyl, heteroalkenyl, alkynyl, heteroalkynyl acyl, carbocyclyl, heterocyclyl, aryl, heteroaryl, and combinations thereof; and n is greater than or equal to 2.

According to certain non-limiting embodiments, the polymeric material comprises a tetra-oxyethylacrylate silane polymer of the structure:

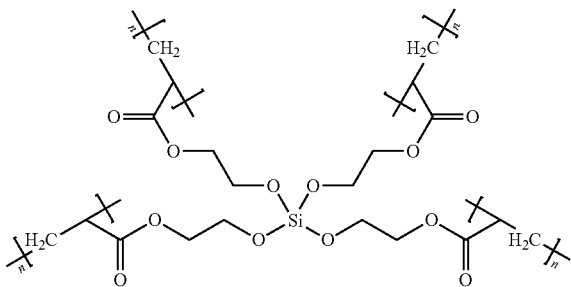

wherein:

n is greater than or equal to 2.

According to other certain non-limiting embodiments, the polymeric material comprises a tetra-oxybutylacrylate silane polymer of the structure:

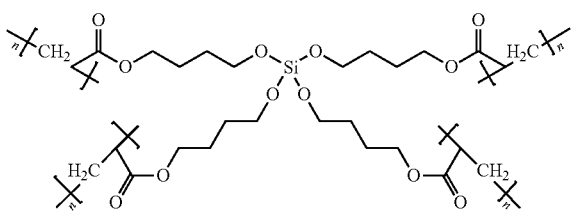

wherein:

n is greater than or equal to 2.

According to certain embodiments, each of the crosslinking moieties may be crosslinked and/or polymerized by, for example, a thiol-ene reaction. Concepts and techniques related to thiol-ene reactions would be generally understood by a person of ordinary skill in the art. In some embodiments, for example, a thiol is reacted with a crosslinking moiety (e.g., the acrylate of a crosslinking moiety) to form a thioether. According to certain embodiments, the reaction between the thiol and the crosslinking moiety may occur by free-radical addition. In some embodiments, after reacting the thiol with the crosslinking moiety, the resultant product may propagate (e.g., polymerize and/or crosslink), for example, to form the polymeric material.

In some embodiments, the thiol is represented by the formula R—SH, wherein R is selected from the group consisting of —CH$_3$, C$_{1-10}$ alkyl, heteroalkyl, alkenyl, heteroalkenyl, alkynyl, heteroalkynyl, acyl, carbocyclyl, heterocyclyl, aryl, heteroaryl, halo, hydroxyl, amino, carbonyl, thiol-containing derivatives thereof, and combinations thereof.

According to certain embodiments, the thiol is a dithiol represented by the formula HS—R—SH, wherein R is selected from the group consisting of —CH$_3$, C$_{1-10}$ alkyl, heteroalkyl, alkenyl, heteroalkenyl, alkynyl, heteroalkynyl, acyl, carbocyclyl, heterocyclyl, aryl, heteroaryl, halo, hydroxyl, amino, carbonyl, thiol-containing derivatives thereof, and combinations thereof.

Higher degrees of thiol functionality are also possible, in some embodiments. For example, in certain embodiments, the thiol may be a trithiol or a tetrathiol, in certain embodiments.

Examples of thiols include, but are not limited to, pentaerythritol tetrakis(3-mercaptopripionate); trimethylolpropoane tris(3-mercaptoproprionate); tetramethylxylene diisocyanate tetra thiol; isophorone diisocyanate tetra thiol; hexamethylene diisocyanate tetra thiol; ethyleneglycol di-2-mercaptoacetate; pentaerythritol tetrakis(2-mercaptoacetate); ethyleneglycol di-3-mercaptoproprionate; 1,2'-ethanedithiol; 1,5'-pentanedithiol; 1,6'-hexanedithiol; 1,10'-decanedithiol; tricyclodecanedithiol; 2,2'-thiodiethanethiol; 2,2'-(ethylenedioxy)diethane thiol; 1,4-bis (3-mercaptobutylyloxy) butane; and/or tris[2-(3-mercaptopropionyloxy) ethyl]isocyanurate.

In certain embodiments, one or more thiyl radicals (e.g., RS., .S—R—S., —S—R—SH) may be generated from the thiol species. The one or more thiyl radicals may be generated by methods that would be understood to a person of ordinary skill in the art, for example, exposing the thiol to a hydrogen atom abstraction initiator (e.g., azobisisobutyronitrile). Upon generating the one or more thiyl radicals, the one or more thiyl radicals may react with the acrylate of the crosslinking moiety (e.g., by free radical addition) to form a polymeric material comprising the a thioether of the structure:

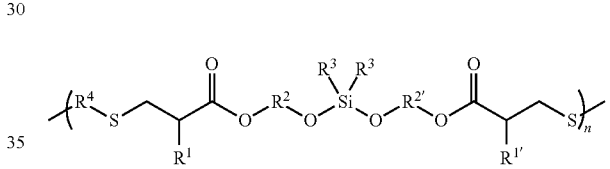

wherein:

$R^1$ and $R^{1\prime}$ are the same or different and are selected from the group consisting of —H, —CH$_3$, C$_{1-10}$ alkyl, heteroalkyl, alkenyl, heteroalkenyl, alkynyl, heteroalkynyl, acyl, carbocyclyl, heterocyclyl, aryl, heteroaryl, halo, hydroxyl, thiol, amino, carbonyl, and combinations thereof;

$R^2$ and $R^{2\prime}$ are the same or different and are selected from the group consisting of C$_{1-10}$ alkyl, heteroalkyl, alkenyl, heteroalkenyl, alkynyl, heteroalkynyl acyl, carbocyclyl, heterocyclyl, aryl, heteroaryl, and combinations thereof;

$R^3$ and $R^{3\prime}$ are the same or different and are selected from the group consisting of —H, —CH$_3$, C$_{1-10}$ alkyl, heteroalkyl, alkenyl, heteroalkenyl, alkynyl, heteroalkynyl, acyl, carbocyclyl, heterocyclyl, aryl, heteroaryl, halo, hydroxyl, thiol, amino, carbonyl, and combinations thereof;

$R^4$ is selected from the group consisting of —CH$_3$, C$_{1-10}$ alkyl, heteroalkyl, alkenyl, heteroalkenyl, alkynyl, heteroalkynyl, acyl, carbocyclyl, heterocyclyl, aryl, heteroaryl, halo, hydroxyl, amino, carbonyl, thiol-containing derivatives thereof, and combinations thereof; and n is greater than or equal to 2.

Although the thioether product shown above depicts a silyl-ether diacrylate species reacting with a thiol, this depiction is meant to be non-limiting, and a thiol may react in a similar manner with any of the aforementioned silyl-ether triacrylates and/or silyl-ether tetraacrylates. Reactions between any of the aforementioned dithiols, trithiols, tetrathiols and any of the aforementioned silyl-ether diacrylates, silyl-ether triacrylates, and/or silyl-ether tetraacrylates are also possible.

The polymeric material may comprise the thiol in any of a variety of suitable amounts. In certain embodiments, for example, the polymeric material comprises the thiol in an amount greater than or equal to 0.5 wt. %, greater than or equal to 1 wt. %, greater than or equal to 5 wt. %, greater than or equal to 10 wt. %, greater than or equal to 20 wt. %, greater than or equal to 30 wt. %, greater than or equal to 40 wt. %, greater than or equal to 50 wt. %, greater than or equal to 60 wt. %, or greater than or equal to 70 wt. % versus the total weight of the polymeric material. In some embodiments, the polymeric material comprises the thiol in amount less than or equal to 75 wt. %, less than or equal to 70 wt. %, less than or equal to 60 wt. %, less than or equal to 50 wt. %, less than or equal to 40 wt. %, less than or equal to 30 wt. %, less than or equal to 20 wt. %, less than or equal to 10 wt. %, less than or equal to 5 wt. %, or less than or equal to 1 wt. % versus the total weight of the composition. Combinations of the above recited ranges are also possible (e.g., the polymeric material comprises the thiol in amount greater than or equal to 0.5 wt. % and less than or equal to 75 wt. % versus the total weight of the polymeric material, the polymeric material comprises the thiol in an amount greater than or equal to 20 wt. % and less than or equal to 50 wt. % versus the total weight of the polymeric material). Other ranges are also possible.

According to certain embodiments, the structurally self-supporting material may comprise any of a variety of additives. For example, in some embodiments, the structurally self-supporting material may comprise a lubricant (e.g., polyethylene, a paraffin, an amide, a fatty acid), a plasticizer (e.g., polyvinyl chloride), an odor additive, a pigment and/or colorant, a flame retardant and/or heat stabilizer (e.g., graphene, graphite, titania, silica), a blowing agent, a filler, an antioxidant, a UV absorber, a photostabilizer, a nucleating agent, a metal deactivator, an antistatic agent, and/or a stabilizer. In certain embodiments, the structurally self-supporting material may comprise silica and/or carbon black.

In some embodiments, the structurally self-supporting material has a high Young's modulus. As used herein, the Young's modulus is given its ordinary meaning in the art and generally refers to the measurement of the elasticity of a material, determined by the ratio of the stress acting on the material to the strain produced by the material. The Young's modulus may be calculated using the equation:

$$E = \frac{FL_0}{A\Delta L}$$

wherein:

E is the Young's modulus;

F is the force exerted on a material under tension;

A is the cross-sectional area of the material, which equals the area of the cross-section perpendicular to the applied force;

$\Delta L$ is the amount by which the length of the material changes (e.g., $\Delta L$ is positive if the material is stretched, and negative when the material is compressed); and $L_0$ is the original length of the material.

According to certain embodiments, the Young's modulus of the structurally self-supporting material is greater than or equal to 1 GPa, greater than or equal to 1.5 GPa, greater than or equal to 2 GPa, greater than or equal to 2.5 GPa, greater than or equal to 3 GPa, greater than or equal to 3.5 GPa, greater than or equal to 4 GPa, or greater than or equal to 4.5 GPa. In some embodiments, the Young's modulus of the structurally self-supporting material is less than or equal to 5 GPa, less than or equal to 4.5 GPa, less than or equal to 4 GPa, less than or equal to 3.5 GPa, less than or equal to 3 GPa, less than or equal to 2.5 GPa, less than or equal to 2 GPa, less than or equal to 1.5 GPa, less than or equal to 1 GPa. Combinations of the above recited ranges are also possible (e.g., the Young's modulus of the structurally self-supporting material is greater than or equal to 1 GPa and less than or equal to 5 GPa, the Young's modulus of the 2.5 GPa and less than or equal to 3.5 GPa). Other ranges are also possible.

According to certain embodiments, a method described herein comprises providing the structurally self-supporting material. In some embodiments, providing the structurally self-supporting material comprises additive manufacturing (e.g., high resolution additive manufacturing) the structurally self-supporting material. In certain embodiments, additive manufacturing may be or comprise 3D printing. For example, in some embodiments, the structurally self-supporting material is provided by 3D printing the material onto a substrate. A person of ordinary skill in the art would be aware that 3D printing techniques may be used in conjunction with, for example, computer-aided design models. In certain embodiments, the structurally self-supporting material is 3D printed on a substrate (e.g., a 3D printing substrate). Any of a variety of substrates may be utilized, including, for example, silica wafers. In some embodiments, 3D printing the structurally self-supporting material may comprise polymerizing (e.g., photopolymerizing and/or photocuring) the plurality of crosslinking moieties (e.g., silyl-ether acrylates) to provide the polymeric material (e.g., silyl-ether acrylate polymer).

Other methods of providing the structurally self-supporting material in addition to additive manufacturing are also possible, such as injection molding and/or spray coating.

In certain embodiments, the method comprises exposing at least a portion of the structurally self-supporting material to $H_2O$ (e.g., liquid water). According to some embodiments, exposing the structurally self-supporting material to $H_2O$ may convert at least a portion of the structurally self-supporting material to a non-structurally self-supporting material. As explained in further detail below, for example, at least a portion of the crosslinking moieties may react (e.g., hydrolyze) as a result of exposing the structurally self-supporting material to $H_2O$. Resultantly, at least a portion of the non-structurally self-supporting material may have a lower Young's modulus than the structurally self-supporting material, such that the non-structurally self-supporting material is or is capable of being distorted (such as, for example, a sag, bend, flop, curve, twist, and the like).

According to some embodiments, the non-structurally self-supporting material may be cohesive. As used herein, the term "cohesive" generally refers to a molecular attraction (e.g., molecular bonding) within a material by which the molecules are united throughout the mass of the material. Advantageously, a cohesive and non-structurally self-supporting material may be shapeable (e.g., bendable, flexible, twistable, and the like), while not being prone to tears, cracks, cracks, and the like.

In certain embodiments, methods of exposing the structurally self-supporting material to $H_2O$ to convert the material to a non-structurally self-supporting material comprise any of a variety of suitable techniques. Exposing the structurally self-supporting material to water is advantageous, as water is abundant, non-toxic, and relatively inexpensive, as compared to other acidic catalysts that may be used to cleave silyl-ethers. According to some embodiments, the structurally self-supporting material may be exposed to liquid water, moisture, solid ice, water vapor, and/or other sources of $H_2O$ that could be envisioned by a person of ordinary skill in the art. For example, in some embodiments, the structurally self-supporting material may be at least partially submerged in liquid water. In certain embodiments, the structurally self-supporting material may be sprayed with liquid water. Without wishing to be bound by theory, the $H_2O$ that the structurally self-supporting material is exposed to may be any of a variety of suitable temperatures such as, for example, room temperature (e.g., about 23° C.), below room temperature (e.g., 0° C. to 23° C.), above room temperature (e.g., 23° C. to 100° C.).

Without wishing to be bound by theory, in some embodiments, after exposing the structurally self-supporting material to $H_2O$, the resultant non-structurally self-supporting material may be at least partially swollen with $H_2O$ (e.g., liquid water). In some embodiments, for example, the non-structurally self-supporting material may comprise $H_2O$ as a result of an interaction between the non-structurally self-supporting material and the $H_2O$ that the structurally self-supporting material has been exposed to. In some embodiments, the interaction between the non-structurally self-supporting material and the $H_2O$ is, for example, one or more hydrogen bonds.

According to certain embodiments, the non-structurally self-supporting material has a low Young's modulus (e.g., as compared to the structurally self-supporting material). The Young's modulus of the non-structurally self-supporting material may be less than the Young's modulus of the structurally self-supporting material. For example, in certain embodiments, the Young's modulus of the non-structurally self-supporting material is less than or equal to 1 GPa, less than or equal to 0.8 GPa, less than or equal to 0.6 GPa, less than or equal to 0.4 Gpa, less than or equal to 0.2 GPa, less than or equal to 0.1 GPa, less than or equal to 0.08 GPa, less than or equal to 0.06 GPa, less than or equal to 0.04 GPa, or less than or equal to 0.02 GPa. In some embodiments, the non-structurally self-supporting material has a Young's modulus greater than or equal to 0.01 GPa, greater than or equal to 0.02 GPa, greater than or equal to 0.04 GPa, greater than or equal to 0.06 GPa, greater than or equal to 0.08 GPa, greater than or equal to 0.1 GPa, greater than or equal to 0.2 GPa, greater than or equal to 0.4 GPa, greater than or equal to 0.6 GPa, or greater than or equal to 0.8 GPa. Combinations of the above-recited ranges are also possible (e.g., the Young's modulus of the non-structurally self-supporting material is less than or equal to 1 GPa and greater than or equal to 0.01 GPa, the Young's modulus of the non-structurally self-supporting material is less than or equal to 0.6 GPa and greater than or equal to 0.06 GPa). Other ranges are also possible. As mentioned above, the Young's modulus may be calculated according to the equation above.

In some embodiments, the structurally self-supporting material may be exposed to $H_2O$ for any of a variety of suitable times. For example, in certain embodiments, the structurally self-supporting material is exposed to $H_2O$ for greater than or equal to 1 second, greater than or equal to 5 seconds, greater than or equal to 30 seconds, greater than or equal to 1 minute, greater than or equal to 5 minutes, greater than or equal to 30 minutes, greater than or equal to 1 hour, greater than or equal to 5 hours, or greater than or equal to 30 hours. According to certain embodiments, the structurally self-supporting material is exposed to $H_2O$ for less than or equal to 50 hours, less than or equal to 30 hours, less than or equal to 5 hours, less than or equal to 1 hour, less than or equal to 30 minutes, less than or equal to 5 minutes, less than or equal to 1 minute, less than or equal to 30 seconds, less than or equal to 5 seconds, or less than or equal to 1 second. Combinations of the above recited ranges are also possible (e.g., the structurally self-supporting material is exposed to $H_2O$ for greater than or equal to 1 second and less than or equal to 50 hours, the structurally self-supporting material is exposed to $H_2O$ for greater than or equal to 1 minute or less than or equal 30 minutes). Other ranges are also possible.

In certain embodiments, the amount of time the structurally self-supporting material is exposed to $H_2O$ may be inversely proportional to the Young's modulus of the resulting non-structurally self-supporting material. Advantageously, the time of exposure to $H_2O$ may be chosen in order to fine-tune the elastomeric properties (e.g., elasticity) of the non-structurally self-supporting material. In certain embodiments, for example, the longer the structurally self-supporting material is exposed to $H_2O$, the lower the Young's modulus of the resulting non-structurally self-supporting material. Without wishing to be bound by theory, the inverse relationship between the amount of time of exposure to $H_2O$ and the Young's modulus of the non-structurally self-supporting material is a result of the degree of reactivity that takes place between the crosslinking moieties (e.g., the silyl-ether acrylates and the $H_2O$), which is described in further detail below.

In some embodiments, the structurally self-supporting material may be exposed to $H_2O$ at any of a variety of suitable temperatures. For example, in certain embodiments, the structurally self-supporting material is exposed to $H_2O$ at a temperature greater than or equal to 25° C., greater than or equal to 50° C., greater than or equal to 50° C., greater than or equal to 75° C., greater than or equal to 100° C., greater than or equal to 110° C., greater than or equal to 120° C., greater than or equal to 130° C., or greater than or equal to 140° C. According to certain embodiments, the structurally self-supporting material is exposed to $H_2O$ at a temperature less than or equal to 150° C., less than or equal to 140° C., less than or equal to 130° C., less than or equal to 120° C., less than or equal to 110° C., less than or equal to 100° C., less than or equal to 75° C., less than or equal to 50° C., or less than or equal to 25° C. Combinations of the above recited ranges are also possible (e.g., the structurally self-supporting material is exposed to $H_2O$ at a temperature greater than or equal to 25° C. and less than or equal to 150° C., the structurally self-supporting material is exposed to $H_2O$ at a temperature greater than or equal to 75° C. and less than or equal 125° C.). Other ranges are also possible. In certain embodiments, when the structurally self-supporting material is exposed to $H_2O$ at a temperature greater than 100° C., the structurally self-supporting material may be exposed to steam (e.g., pressurized steam). In some embodiments, for example, the structurally self-supporting material may be exposed to pressurized steam in an autoclave.

In certain embodiments, exposing the structurally self-supporting material to $H_2O$ at higher temperatures may have an inversely proportional effect on the Young's modulus of the resulting non-structurally self-supporting material. Advantageously, the temperature that the structurally self-supporting material is exposed to $H_2O$ at may be chosen in order to fine-tune the elastomeric properties (e.g., elasticity) of the non-structurally self-supporting material. In certain embodiments, for example, the higher the temperature that the structurally self-supporting material is exposed to $H_2O$, the lower the Young's modulus of the resulting non-structurally self-supporting material. Without wishing to be bound by theory, the inverse relationship between the temperature of exposure to $H_2O$ and the Young's modulus of the non-structurally self-supporting material is a result of the degree of reactivity that takes place between the crosslinking moieties (e.g., the silyl-ether acrylates and the $H_2O$), which is described in further detail below.

According to certain embodiments, the structurally self-supporting material may be exposed to $H_2O$ for any of a variety of the aforementioned times at any of a variety of the aforementioned temperatures. For example, in some non-limiting embodiments, the structurally self-supporting material is exposed to $H_2O$ for between greater than or equal to 1 second and less than or equal to 30 minutes and a temperature between greater than or equal to 100° C. and less than or equal to 130° C.

In certain embodiments, exposing the structurally self-supporting material to $H_2O$ results in reacting at least portion of the crosslinking moieties. For example, in some embodiments, reacting at least a portion of the crosslinking moieties results in at least a portion of the structurally self-supporting material being rendered non-structurally self-supporting. According to certain embodiments, reacting at least a portion of the crosslinking moieties comprises hydrolyzing at least a portion of the crosslinking moieties.

In certain embodiments, for example, reacting the crosslinking moieties results in hydrolyzation and/or scission of at least a portion of the crosslinking moieties, thereby providing a non-structurally self-supporting material. The non-structurally self-supporting material may comprise stable polyacrylate crosslinks, in some embodiments, thereby providing the material with polymeric properties, such as, but not limited to, chemical and thermal resistance. In certain embodiments, for example, the non-structurally self-supporting material comprises a polymer of the structure:

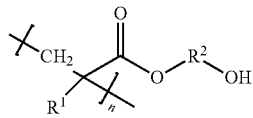

wherein:

$R^1$ is selected from the group consisting of —H, —$CH_3$, $C_{1-10}$ alkyl, heteroalkyl, alkenyl, heteroalkenyl, alkynyl, heteroalkynyl, acyl, carbocyclyl, heterocyclyl, aryl, heteroaryl, halo, hydroxyl, thiol, amino, carbonyl, and combinations thereof;

$R^2$ is selected from the group consisting of $C_{1-10}$ alkyl, heteroalkyl, alkenyl, heteroalkenyl, alkynyl, heteroalkynyl acyl, carbocyclyl, heterocyclyl, aryl, heteroaryl, and combinations thereof; and n is greater than or equal to 2.

According to some embodiments, the non-structurally self-supporting material comprises a thioether of the structure:

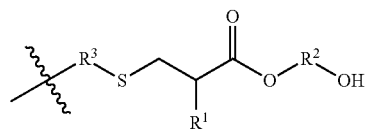

wherein:

$R^1$ is selected from the group consisting of —H, —$CH_3$, $C_{1-10}$ alkyl, heteroalkyl, alkenyl, heteroalkenyl, alkynyl, heteroalkynyl, acyl, carbocyclyl, heterocyclyl, aryl, heteroaryl, halo, hydroxyl, thiol, amino, carbonyl, and combinations thereof;

$R^2$ is selected from the group consisting of $C_{1-10}$ alkyl, heteroalkyl, alkenyl, heteroalkenyl, alkynyl, heteroalkynyl acyl, carbocyclyl, heterocyclyl, aryl, heteroaryl, and combinations thereof;

$R^3$ is selected from the group consisting of —$CH_3$, $C_{1-10}$ alkyl, heteroalkyl, alkenyl, heteroalkenyl, alkynyl, heteroalkynyl, acyl, carbocyclyl, heterocyclyl, aryl, heteroaryl, halo, hydroxyl, amino, carbonyl, thiol-containing derivatives thereof, and combinations thereof; and n is greater than or equal to 2.

In certain embodiments, the thioether may be propagated to one or more thioethers.

In certain embodiments, reacting at least a portion of the crosslinking moieties results in hydrolyzation of the crosslinking moiety, thereby providing a silanol of the structure:

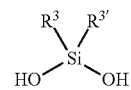

wherein:

$R^3$ and $R^{3'}$ are the same or different and are selected from the group consisting of —H, —$CH_3$, $C_{1-10}$ alkyl, heteroalkyl, alkenyl, heteroalkenyl, alkynyl, heteroalkynyl, acyl, carbocyclyl, heterocyclyl, aryl, heteroaryl, halo, hydroxyl, thiol, amino, carbonyl, and combinations thereof.

In certain embodiments, the silanol is labile and not incorporated into the non-structurally self-supporting material. According to some embodiments, for example, the silanol may be removed from the non-structurally self-supporting material by condensing onto an external material, such as silica.

According to certain embodiments, reacting at least a portion of the crosslinking moieties and converting the structurally self-supporting material to a non-structurally self-supporting material may not change or alter any additive that was incorporated in the structurally self-supporting material.

According to certain embodiments, at least a portion of the material may be structurally self-supporting and at least a portion of the material may be non-structurally self-supporting. For example, in some embodiments, a portion of the structurally self-supporting material may be exposed to $H_2O$, instead of, for example, exposing all the structurally self-supporting material to $H_2O$. Therefore, in some such embodiments, the portion of the material that has been exposed to $H_2O$ may be converted from a structurally self-supporting material to a non-structurally self-supporting material, while the material that was not exposed to $H_2O$ remains structurally self-supporting. In certain embodiments, a material that is at least partially structurally self-supporting and at least partially non-structurally self-supporting may be advantageous. For example, the portion of the material that is structurally self-supporting may be subjected to additive manufacturing (e.g., 3D printing), while the portion of the material that is non-structurally self-supporting is fabricated into a product.

According to certain embodiments, the non-structurally self-supporting material may be utilized to provide any of a variety of suitable products. In some embodiments, for example, the non-structurally self-supporting material may be manufactured (e.g., shaped, molded, and the like) into a product. In certain embodiments, the product may be used for medical applications (e.g., bio-printing, medical devices), industrial applications (e.g., apparel, art and jewelry, automotive parts, construction parts, firearms, computers, robots, sensors, actuators), and/or food production (e.g., packaging). In some non-limiting embodiments, the non-structurally self-supporting material may be used as a sealant and/or adhesive. Other applications are also possible.

Definitions of specific functional groups and chemical terms are described in detail below. The chemical elements are identified in accordance with the Periodic Table of the Elements, CAS version, Handbook of Chemistry and Physics, 75' Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry, 5th* Edition, John Wiley & Sons, Inc., New York, 2001; Larock, *Comprehensive Organic Transformations*, VCH Publishers, Inc., New York, 1989; and Carruthers, *Some Modern Methods of Organic Synthesis, 3rd* Edition, Cambridge University Press, Cambridge, 1987.

When a range of values is listed, it is intended to encompass each value and sub-range within the range. For example "$C_{1-6}$ alkyl" is intended to encompass, $C_1$, $C_2$, $C_3$, $C_4$, $C_5$, $C_6$, $C_{1-6}$, $C_{1-5}$, $C_{1-4}$, $C_{1-3}$, $C_{1-2}$, $C_{2-6}$, $C_{2-5}$, $C_{2-4}$, $C_{2-3}$, $C_{3-6}$, $C_{3-5}$, $C_{3-4}$, $C_{4-6}$, $C_{4-5}$, and $C_{5-6}$ alkyl.

As used herein, "alkyl" refers to a radical of a straight-chain or branched saturated hydrocarbon group having from 1 to 10 carbon atoms ("$C_{1-10}$ alkyl"). In some embodiments, an alkyl group has 1 to 9 carbon atoms ("$C_{1-9}$ alkyl"). In some embodiments, an alkyl group has 1 to 8 carbon atoms ("$C_{1-8}$ alkyl"). In some embodiments, an alkyl group has 1 to 7 carbon atoms ("$C_{1-7}$ alkyl"). In some embodiments, an alkyl group has 1 to 6 carbon atoms ("$C_{1-6}$ alkyl"). In some embodiments, an alkyl group has 1 to 5 carbon atoms ("$C_{1-5}$ alkyl"). In some embodiments, an alkyl group has 1 to 4 carbon atoms ("$C_{1-4}$ alkyl"). In some embodiments, an alkyl group has 1 to 3 carbon atoms ("$C_{1-3}$ alkyl"). In some embodiments, an alkyl group has 1 to 2 carbon atoms ("$C_{1-2}$ alkyl"). In some embodiments, an alkyl group has 1 carbon atom ("$C_1$ alkyl"). In some embodiments, an alkyl group has 2 to 6 carbon atoms ("$C_{2-6}$ alkyl"). Examples of $C_{1-6}$ alkyl groups include methyl ($C_1$), ethyl ($C_2$), n-propyl ($C_3$), iso-propyl ($C_3$), n-butyl ($C_4$), tert-butyl ($C_4$), sec-butyl ($C_4$), iso-butyl ($C_4$), n-pentyl ($C_5$), 3-pentanyl ($C_5$), amyl ($C_5$), neopentyl ($C_5$), 3-methyl-2-butanyl ($C_5$), tertiary amyl ($C_5$), and n-hexyl ($C_6$). Additional examples of alkyl groups include n-heptyl ($C_7$), n-octyl ($C_5$) and the like. Unless otherwise specified, each instance of an alkyl group is independently unsubstituted (an "unsubstituted alkyl") or substituted (a "substituted alkyl") with one or more substituents. In certain embodiments, the alkyl group is an unsubstituted $C_{1-10}$ alkyl (e.g., —$CH_3$). In certain embodiments, the alkyl group is a substituted $C_{1-10}$ alkyl.

As used herein, "heteroalkyl" refers to an alkyl group as defined herein which further includes at least one heteroatom (e.g., 1, 2, 3, or 4 heteroatoms) selected from oxygen, nitrogen, or sulfur within (i.e., inserted between adjacent carbon atoms of) and/or placed at one or more terminal position(s) of the parent chain. In certain embodiments, a heteroalkyl group refers to a saturated group having from 1 to 10 carbon atoms and 1 or more heteroatoms within the parent chain ("hetero$C_{1-10}$ alkyl"). In some embodiments, a heteroalkyl group is a saturated group having 1 to 9 carbon atoms and 1 or more heteroatoms within the parent chain ("hetero$C_{1-9}$ alkyl"). In some embodiments, a heteroalkyl group is a saturated group having 1 to 8 carbon atoms and 1 or more heteroatoms within the parent chain ("hetero$C_{1-8}$ alkyl"). In some embodiments, a heteroalkyl group is a saturated group having 1 to 7 carbon atoms and 1 or more heteroatoms within the parent chain ("hetero$C_{1-7}$ alkyl"). In some embodiments, a heteroalkyl group is a saturated group having 1 to 6 carbon atoms and 1 or more heteroatoms within the parent chain ("hetero$C_{1-6}$ alkyl"). In some embodiments, a heteroalkyl group is a saturated group having 1 to 5 carbon atoms and 1 or 2 heteroatoms within the parent chain ("hetero$C_{1-5}$ alkyl"). In some embodiments, a heteroalkyl group is a saturated group having 1 to 4 carbon atoms and 1 or 2 heteroatoms within the parent chain ("hetero$C_{1-4}$ alkyl"). In some embodiments, a heteroalkyl group is a saturated group having 1 to 3 carbon atoms and 1 heteroatom within the parent chain ("hetero$C_{1-3}$ alkyl"). In some embodiments, a heteroalkyl group is a saturated group having 1 to 2 carbon atoms and 1 heteroatom within the parent chain ("hetero$C_{1-2}$ alkyl"). In some embodiments, a heteroalkyl group is a saturated group having 1 carbon atom and 1 heteroatom ("hetero$C_1$ alkyl"). In some embodiments, a heteroalkyl group is a saturated group having 2 to 6 carbon atoms and 1 or 2 heteroatoms within the parent chain ("hetero$C_{2-6}$ alkyl"). Unless otherwise specified, each instance of a heteroalkyl group is independently unsubstituted (an "unsubstituted heteroalkyl") or substituted (a "substituted heteroalkyl") with one or more substituents. In certain embodiments, the heteroalkyl group is an unsubstituted hetero$C_{1-10}$ alkyl. In certain embodiments, the heteroalkyl group is a substituted hetero$C_{1-10}$ alkyl.

As used herein, "alkenyl" refers to a radical of a straight-chain or branched hydrocarbon group having from 2 to 10 carbon atoms and one or more carbon-carbon double bonds (e.g., 1, 2, 3, or 4 double bonds). In some embodiments, an alkenyl group has 2 to 9 carbon atoms ("$C_{2-9}$ alkenyl"). In some embodiments, an alkenyl group has 2 to 8 carbon atoms ("$C_{2-8}$ alkenyl"). In some embodiments, an alkenyl group has 2 to 7 carbon atoms ("$C_{2-7}$ alkenyl"). In some embodiments, an alkenyl group has 2 to 6 carbon atoms ("$C_{2-6}$ alkenyl"). In some embodiments, an alkenyl group has 2 to 5 carbon atoms ("$C_{2-5}$ alkenyl"). In some embodiments, an alkenyl group has 2 to 4 carbon atoms ("$C_{2-4}$ alkenyl"). In some embodiments, an alkenyl group has 2 to 3 carbon atoms ("$C_{2-3}$ alkenyl"). In some embodiments, an alkenyl group has 2 carbon atoms ("$C_2$ alkenyl"). The one or more carbon-carbon double bonds can be internal (such as in 2-butenyl) or terminal (such as in 1-butenyl). Examples of $C_{2-4}$ alkenyl groups include ethenyl ($C_2$), 1-propenyl ($C_3$), 2-propenyl ($C_3$), 1-butenyl ($C_4$), 2-butenyl ($C_4$), butadienyl ($C_4$), and the like. Examples of $C_{2-6}$ alkenyl groups include the aforementioned $C_{2-4}$ alkenyl groups as well as pentenyl ($C_5$), pentadienyl ($C_5$), hexenyl ($C_6$), and the like. Additional examples of alkenyl include heptenyl ($C_7$), octenyl ($C_8$), octatrienyl ($C_8$), and the like. Unless otherwise specified, each instance of an alkenyl group is independently unsubstituted (an "unsubstituted alkenyl") or substituted (a "substituted alkenyl") with one or more substituents. In certain embodiments, the alkenyl group is an unsubstituted $C_{2-10}$ alkenyl. In certain embodiments, the alkenyl group is a substituted $C_{2-10}$ alkenyl.

As used herein, "heteroalkenyl" refers to an alkenyl group as defined herein which further includes at least one heteroatom (e.g., 1, 2, 3, or 4 heteroatoms) selected from oxygen, nitrogen, or sulfur within (i.e., inserted between adjacent carbon atoms of) and/or placed at one or more terminal position(s) of the parent chain. In certain embodiments, a heteroalkenyl group refers to a group having from 2 to 10 carbon atoms, at least one double bond, and 1 or more heteroatoms within the parent chain ("heteroC$_{2-10}$ alkenyl"). In some embodiments, a heteroalkenyl group has 2 to 9 carbon atoms at least one double bond, and 1 or more heteroatoms within the parent chain ("heteroC$_{2-9}$ alkenyl"). In some embodiments, a heteroalkenyl group has 2 to 8 carbon atoms, at least one double bond, and 1 or more heteroatoms within the parent chain ("heteroC$_{2-8}$ alkenyl"). In some embodiments, a heteroalkenyl group has 2 to 7 carbon atoms, at least one double bond, and 1 or more heteroatoms within the parent chain ("heteroC$_{2-7}$ alkenyl"). In some embodiments, a heteroalkenyl group has 2 to 6 carbon atoms, at least one double bond, and 1 or more heteroatoms within the parent chain ("heteroC$_{2-6}$ alkenyl"). In some embodiments, a heteroalkenyl group has 2 to 5 carbon atoms, at least one double bond, and 1 or 2 heteroatoms within the parent chain ("heteroC$_{2-5}$ alkenyl").

In some embodiments, a heteroalkenyl group has 2 to 4 carbon atoms, at least one double bond, and 1 or 2 heteroatoms within the parent chain ("heteroC$_{2-4}$ alkenyl"). In some embodiments, a heteroalkenyl group has 2 to 3 carbon atoms, at least one double bond, and 1 heteroatom within the parent chain ("heteroC$_{2-3}$ alkenyl"). In some embodiments, a heteroalkenyl group has 2 to 6 carbon atoms, at least one double bond, and 1 or 2 heteroatoms within the parent chain ("heteroC$_{2-6}$ alkenyl"). Unless otherwise specified, each instance of a heteroalkenyl group is independently unsubstituted (an "unsubstituted heteroalkenyl") or substituted (a "substituted heteroalkenyl") with one or more substituents. In certain embodiments, the heteroalkenyl group is an unsubstituted heteroC$_{2-10}$ alkenyl. In certain embodiments, the heteroalkenyl group is a substituted heteroC$_{2-10}$ alkenyl.

As used herein, "alkynyl" refers to a radical of a straight-chain or branched hydrocarbon group having from 2 to 10 carbon atoms and one or more carbon-carbon triple bonds (e.g., 1, 2, 3, or 4 triple bonds) ("C$_{2-10}$ alkynyl"). In some embodiments, an alkynyl group has 2 to 9 carbon atoms ("C$_{2-9}$ alkynyl"). In some embodiments, an alkynyl group has 2 to 8 carbon atoms ("C$_{2-8}$ alkynyl"). In some embodiments, an alkynyl group has 2 to 7 carbon atoms ("C$_{2-7}$ alkynyl"). In some embodiments, an alkynyl group has 2 to 6 carbon atoms ("C$_{2-6}$ alkynyl"). In some embodiments, an alkynyl group has 2 to 5 carbon atoms ("C$_{2-5}$ alkynyl"). In some embodiments, an alkynyl group has 2 to 4 carbon atoms ("C$_{2-4}$ alkynyl"). In some embodiments, an alkynyl group has 2 to 3 carbon atoms ("C$_{2-3}$ alkynyl"). In some embodiments, an alkynyl group has 2 carbon atoms ("C$_2$ alkynyl"). The one or more carbon-carbon triple bonds can be internal (such as in 2-butynyl) or terminal (such as in 1-butynyl). Examples of C$_{2-4}$ alkynyl groups include, without limitation, ethynyl (C$_2$), 1-propynyl (C$_3$), 2-propynyl (C$_3$), 1-butynyl (C$_4$), 2-butynyl (C$_4$), and the like. Examples of C$_{2-6}$ alkenyl groups include the aforementioned C$_{2-4}$ alkynyl groups as well as pentynyl (C$_5$), hexynyl (C$_6$), and the like. Additional examples of alkynyl include heptynyl (C$_7$), octynyl (C$_8$), and the like. Unless otherwise specified, each instance of an alkynyl group is independently unsubstituted (an "unsubstituted alkynyl") or substituted (a "substituted alkynyl") with one or more substituents. In certain embodiments, the alkynyl group is an unsubstituted C$_{2-10}$ alkynyl. In certain embodiments, the alkynyl group is a substituted C$_{2-10}$ alkynyl.

As used herein, "heteroalkynyl" refers to an alkynyl group as defined herein which further includes at least one heteroatom (e.g., 1, 2, 3, or 4 heteroatoms) selected from oxygen, nitrogen, or sulfur within (i.e., inserted between adjacent carbon atoms of) and/or placed at one or more terminal position(s) of the parent chain. In certain embodiments, a heteroalkynyl group refers to a group having from 2 to 10 carbon atoms, at least one triple bond, and 1 or more heteroatoms within the parent chain ("heteroC$_{2-10}$ alkynyl"). In some embodiments, a heteroalkynyl group has 2 to 9 carbon atoms, at least one triple bond, and 1 or more heteroatoms within the parent chain ("heteroC$_{2-9}$ alkynyl"). In some embodiments, a heteroalkynyl group has 2 to 8 carbon atoms, at least one triple bond, and 1 or more heteroatoms within the parent chain ("heteroC$_{2-8}$ alkynyl"). In some embodiments, a heteroalkynyl group has 2 to 7 carbon atoms, at least one triple bond, and 1 or more heteroatoms within the parent chain ("heteroC$_{2-7}$ alkynyl"). In some embodiments, a heteroalkynyl group has 2 to 6 carbon atoms, at least one triple bond, and 1 or more heteroatoms within the parent chain ("heteroC$_{2-6}$ alkynyl"). In some embodiments, a heteroalkynyl group has 2 to 5 carbon atoms, at least one triple bond, and 1 or 2 heteroatoms within the parent chain ("heteroC$_{2-5}$ alkynyl"). In some embodiments, a heteroalkynyl group has 2 to 4 carbon atoms, at least one triple bond, and 1 or 2 heteroatoms within the parent chain ("heteroC$_{2-4}$ alkynyl"). In some embodiments, a heteroalkynyl group has 2 to 3 carbon atoms, at least one triple bond, and 1 heteroatom within the parent chain ("heteroC$_{2-3}$ alkynyl"). In some embodiments, a heteroalkynyl group has 2 to 6 carbon atoms, at least one triple bond, and 1 or 2 heteroatoms within the parent chain ("heteroC$_{2-6}$ alkynyl"). Unless otherwise specified, each instance of a heteroalkynyl group is independently unsubstituted (an "unsubstituted heteroalkynyl") or substituted (a "substituted heteroalkynyl") with one or more substituents. In certain embodiments, the heteroalkynyl group is an unsubstituted heteroC$_{2-10}$ alkynyl. In certain embodiments, the heteroalkynyl group is a substituted heteroC$_{2-10}$ alkynyl.

The term "acyl" refers to a group having the general formula —C(=O)R$^{X1}$, —C(=O)OR$^{X1}$, —C(=O)—O—C(=O)R$^{X1}$, —C(=O)SR$^{X1}$, —C(=O)N(R$^{X1}$)$_2$, —C(=S)R$^{X1}$, —C(=S)N(R$^{X1}$)$_2$, and —C(=S)S(R$^{X1}$), —C(=NR$^{X1}$)R$^{X1}$, —C(=NR$^{X1}$)OR$^{X1}$, —C(=NR$^{X1}$)SR$^{X1}$, and —C(=NR$^{X1}$)N(R$^{X1}$)$_2$, wherein R$^{X1}$ is hydrogen; halogen; substituted or unsubstituted hydroxyl; substituted or unsubstituted thiol; substituted or unsubstituted amino; substituted or unsubstituted acyl, cyclic or acyclic, substituted or unsubstituted, branched or unbranched aliphatic; cyclic or acyclic, substituted or unsubstituted, branched or unbranched heteroaliphatic; cyclic or acyclic, substituted or unsubstituted, branched or unbranched alkyl; cyclic or acyclic, substituted or unsubstituted, branched or unbranched alkenyl; substituted or unsubstituted alkynyl; substituted or unsubstituted aryl, substituted or unsubstituted heteroaryl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, mono- or di-aliphaticamino, mono- or di-heteroaliphaticamino, mono- or di-alkylamino, mono- or di-heteroalkylamino, mono- or di-arylamino, or mono- or di-heteroarylamino; or two R$^{X1}$ groups taken together form a 5- to 6-membered heterocyclic ring. Exemplary acyl groups include aldehydes (—CHO), carboxylic acids (—CO$_2$H), ketones, acyl halides, esters, amides, imines, carbonates, carbamates, and ureas. Acyl substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

"Carbocyclyl," "carbocycle," or "carbocyclic" refers to a radical of a non-aromatic cyclic hydrocarbon group having from 3 to 10 ring carbon atoms ("$C_{3-10}$ carbocyclyl") and zero heteroatoms in the non-aromatic ring system. In some embodiments, a carbocyclyl group has 3 to 8 ring carbon atoms ("$C_{3-8}$ carbocyclyl"). In some embodiments, a carbocyclyl group has 3 to 6 ring carbon atoms ("$C_{3-6}$ carbocyclyl"). In some embodiments, a carbocyclyl group has 3 to 6 ring carbon atoms ("$C_{3-6}$ carbocyclyl"). In some embodiments, a carbocyclyl group has 5 to 10 ring carbon atoms ("$C_{5-10}$ carbocyclyl"). Exemplary $C_{3-6}$ carbocyclyl groups include, without limitation, cyclopropyl ($C_3$), cyclopropenyl ($C_3$), cyclobutyl ($C_4$), cyclobutenyl ($C_4$), cyclopentyl ($C_5$), cyclopentenyl ($C_5$), cyclohexyl ($C_6$), cyclohexenyl ($C_6$), cyclohexadienyl ($C_6$), and the like. Exemplary $C_{3-8}$ carbocyclyl groups include, without limitation, the aforementioned $C_{3-6}$ carbocyclyl groups as well as cycloheptyl ($C_7$), cycloheptenyl ($C_7$), cycloheptadienyl ($C_7$), cycloheptatrienyl ($C_7$), cyclooctyl ($C_8$), cyclooctenyl ($C_8$), bicyclo[2.2.1] heptanyl ($C_7$), bicyclo[2.2.2]octanyl ($C_8$), and the like. Exemplary $C_{3-10}$ carbocyclyl groups include, without limitation, the aforementioned $C_{3-8}$ carbocyclyl groups as well as cyclononyl ($C_9$), cyclononenyl ($C_9$), cyclodecyl ($C_{10}$), cyclodecenyl ($C_{10}$), octahydro-1H-indenyl ($C_9$), decahydronaphthalenyl ($C_{10}$), spiro[4.5]decanyl ($C_{10}$), and the like. As the foregoing examples illustrate, in certain embodiments, the carbocyclyl group is either monocyclic ("monocyclic carbocyclyl") or contain a fused, bridged. or spiro ring system such as a bicyclic system ("bicyclic carbocyclyl"). Carbocyclylcan be saturated, and saturated carbocyclyl is referred to as "cycloalkyl." In some embodiments, carbocyclyl is a monocyclic, saturated carbocyclyl group having from 3 to 10 ring carbon atoms ("$C_{3-10}$ cycloalkyl"). In some embodiments, a cycloalkyl group has 3 to 8 ring carbon atoms ("$C_{3-8}$ cycloalkyl"). In some embodiments, a cycloalkyl group has 3 to 6 ring carbon atoms ("$C_{3-6}$ cycloalkyl"). In some embodiments, a cycloalkyl group has 5 to 6 ring carbon atoms ("$C_{5-6}$ cycloalkyl"). In some embodiments, a cycloalkyl group has 5 to 10 ring carbon atoms ("$C_{5-10}$ cycloalkyl"). Examples of $C_{5-6}$ cycloalkyl groups include cyclopentyl ($C_5$) and cyclohexyl ($C_5$). Examples of $C_{3-6}$ cycloalkyl groups include the aforementioned $C_{3-6}$ cycloalkyl groups as well as cyclopropyl ($C_3$) and cyclobutyl ($C_4$). Examples of $C_{3-8}$ cycloalkyl groups include the aforementioned $C_{3-6}$ cycloalkyl groups as well as cycloheptyl ($C_7$) and cyclooctyl ($C_8$). Unless otherwise specified, each instance of a cycloalkyl group is independently unsubstituted (an "unsubstituted cycloalkyl") or substituted (a "substituted cycloalkyl") with one or more substituents. In certain embodiments, the cycloalkyl group is unsubstituted $C_{3-10}$ cycloalkyl. In certain embodiments, the cycloalkyl group is substituted $C_{3-10}$ cycloalkyl. Carbocyclyl can be partially unsaturated. Carbocyclyl including one or more C=C double bonds in the carbocyclic ring is referred to as "cycloalkenyl." Carbocyclyl including one or more C≡C triple bonds in the carbocyclic ring is referred to as "cycloalkynyl." Carbocyclyl includes aryl. "Carbocyclyl" also includes ring systems wherein the carbocyclic ring, as defined above, is fused with one or more aryl or heteroaryl groups wherein the point of attachment is on the carbocyclic ring, and in such instances, the number of carbons continue to designate the number of carbons in the carbocyclic ring system. Unless otherwise specified, each instance of a carbocyclyl group is independently optionally substituted, i.e., unsubstituted (an "unsubstituted carbocyclyl") or substituted (a "substituted carbocyclyl") with one or more substituents. In certain embodiments, the carbocyclyl group is unsubstituted $C_{3-10}$ carbocyclyl. In certain embodiments, the carbocyclyl group is substituted $C_{3-10}$ carbocyclyl.

As used herein, "heterocyclyl" or "heterocyclic" refers to a radical of a 3- to 14-membered non-aromatic ring system having ring carbon atoms and 1 to 4 ring heteroatoms, wherein each heteroatom is independently selected from nitrogen, oxygen, and sulfur ("3-14 membered heterocyclyl"). In heterocyclyl groups that contain one or more nitrogen atoms, the point of attachment can be a carbon or nitrogen atom, as valency permits. A heterocyclyl group can either be monocyclic ("monocyclic heterocyclyl") or polycyclic (e.g., a fused, bridged or spiro ring system such as a bicyclic system ("bicyclic heterocyclyl") or tricyclic system ("tricyclic heterocyclyl")), and can be saturated or can contain one or more carbon-carbon double or triple bonds. Heterocyclyl polycyclic ring systems can include one or more heteroatoms in one or both rings. "Heterocyclyl" also includes ring systems wherein the heterocyclyl ring, as defined above, is fused with one or more carbocyclyl groups wherein the point of attachment is either on the carbocyclyl or heterocyclyl ring, or ring systems wherein the heterocyclyl ring, as defined above, is fused with one or more aryl or heteroaryl groups, wherein the point of attachment is on the heterocyclyl ring, and in such instances, the number of ring members continue to designate the number of ring members in the heterocyclyl ring system. Unless otherwise specified, each instance of heterocyclyl is independently unsubstituted (an "unsubstituted heterocyclyl") or substituted (a "substituted heterocyclyl") with one or more substituents. In certain embodiments, the heterocyclyl group is an unsubstituted 3-14 membered heterocyclyl. In certain embodiments, the heterocyclyl group is a substituted 3-14 membered heterocyclyl.

In some embodiments, a heterocyclyl group is a 5-10 membered non-aromatic ring system having ring carbon atoms and 1-4 ring heteroatoms, wherein each heteroatom is independently selected from nitrogen, oxygen, and sulfur ("5-10 membered heterocyclyl"). In some embodiments, a heterocyclyl group is a 5-8 membered non-aromatic ring system having ring carbon atoms and 1-4 ring heteroatoms, wherein each heteroatom is independently selected from nitrogen, oxygen, and sulfur ("5-8 membered heterocyclyl"). In some embodiments, a heterocyclyl group is a 5-6 membered non-aromatic ring system having ring carbon atoms and 1-4 ring heteroatoms, wherein each heteroatom is independently selected from nitrogen, oxygen, and sulfur ("5-6 membered heterocyclyl"). In some embodiments, the 5-6 membered heterocyclyl has 1-3 ring heteroatoms selected from nitrogen, oxygen, and sulfur. In some embodiments, the 5-6 membered heterocyclyl has 1-2 ring heteroatoms selected from nitrogen, oxygen, and sulfur. In some embodiments, the 5-6 membered heterocyclyl has 1 ring heteroatom selected from nitrogen, oxygen, and sulfur. Exemplary 3-membered heterocyclyl groups containing 1 heteroatom include, without limitation, azirdinyl, oxiranyl, and thiiranyl.

Exemplary 4-membered heterocyclyl groups containing 1 heteroatom include, without limitation, azetidinyl, oxetanyl, and thietanyl. Exemplary 5-membered heterocyclyl groups containing 1 heteroatom include, without limitation, tetrahydrofuranyl, dihydrofuranyl, tetrahydrothiophenyl, dihydrothiophenyl, pyrrolidinyl, dihydropyrrolyl, and pyrrolyl-2,5-dione. Exemplary 5-membered heterocyclyl groups containing 2 heteroatoms include, without limitation, dioxolanyl, oxathiolanyl and dithiolanyl.

Exemplary 5-membered heterocyclyl groups containing 3 heteroatoms include, without limitation, triazolinyl, oxadiazolinyl, and thiadiazolinyl.

Exemplary 6-membered heterocyclyl groups containing 1 heteroatom include, without limitation, piperidinyl, tetrahydropyranyl, dihydropyridinyl, and thianyl.

Exemplary 6-membered heterocyclyl groups containing 2 heteroatoms include, without limitation, piperazinyl, morpholinyl, dithianyl, and dioxanyl. Exemplary 6-membered heterocyclyl groups containing 3 heteroatoms include, without limitation, triazinanyl.

Exemplary 7-membered heterocyclyl groups containing 1 heteroatom include, without limitation, azepanyl, oxepanyl and thiepanyl. Exemplary 8-membered heterocyclyl groups containing 1 heteroatom include, without limitation, azocanyl, oxecanyl and thiocanyl. Exemplary bicyclic heterocyclyl groups include, without limitation, indolinyl, isoindolinyl, dihydrobenzofuranyl, dihydrobenzothienyl, tetra-hydrobenzothienyl, tetrahydrobenzofuranyl, tetrahydroindolyl, tetrahydroquinolinyl, tetrahydroisoquinolinyl, decahydroquinolinyl, decahydroisoquinolinyl, octahydrochromenyl, octahydroisochromenyl, decahydronaphthyridinyl, decahydro-1,8-naphthyridinyl, octahydropyrrolo[3,2-b]pyrrole, indolinyl, phthalimidyl, naphthalimidyl, chromanyl, chromenyl, 1H-benzo[e][1,4]diazepinyl, 1,4,5,7-tetrahydropyrano[3,4-b]pyrrolyl, 5,6-dihydro-4H-furo[3,2-b]pyrrolyl, 6,7-dihydro-5H-furo[3,2-b]pyranyl, 5,7-dihydro-4H-thieno[2,3-c]pyranyl, 2,3-dihydro-1H-pyrrolo[2,3-b]pyridinyl, 2,3-dihydrofuro[2,3-b]pyridinyl, 4,5,6,7-tetrahydro-1H-pyrrolo[2,3-b]pyridinyl, 4,5,6,7-tetrahydrofuro[3,2-c]pyridinyl, 4,5,6,7-tetrahydrothieno[3,2-b]pyridinyl, 1,2,3,4-tetrahydro-1,6-naphthyridinyl, and the like.

As used herein, "aryl" refers to a radical of a monocyclic or polycyclic (e.g., bicyclic or tricyclic) 4n+2 aromatic ring system (e.g., having 6, 10, or 14 π electrons shared in a cyclic array) having 6-14 ring carbon atoms and zero heteroatoms provided in the aromatic ring system ("$C_{6-14}$ aryl"). In some embodiments, an aryl group has 6 ring carbon atoms ("$C_6$ aryl"; e.g., phenyl). In some embodiments, an aryl group has 10 ring carbon atoms ("$C_{10}$ aryl"; e.g., naphthyl such as 1-naphthyl and 2-naphthyl). In some embodiments, an aryl group has 14 ring carbon atoms ("$C_{14}$ aryl"; e.g., anthracyl). "Aryl" also includes ring systems wherein the aryl ring, as defined above, is fused with one or more carbocyclyl or heterocyclyl groups wherein the radical or point of attachment is on the aryl ring, and in such instances, the number of carbon atoms continue to designate the number of carbon atoms in the aryl ring system. Unless otherwise specified, each instance of an aryl group is independently unsubstituted (an "unsubstituted aryl") or substituted (a "substituted aryl") with one or more substituents.

In certain embodiments, the aryl group is an unsubstituted $C_{6-14}$ aryl. In certain embodiments, the aryl group is a substituted $C_{6-14}$ aryl.

As used herein, "heteroaryl" refers to a radical of a 5-14 membered monocyclic or polycyclic (e.g., bicyclic, tricyclic) 4n+2 aromatic ring system (e.g., having 6, 10, or 14 π electrons shared in a cyclic array) having ring carbon atoms and 1-4 ring heteroatoms provided in the aromatic ring system, wherein each heteroatom is independently selected from nitrogen, oxygen, and sulfur ("5-14 membered heteroaryl"). In heteroaryl groups that contain one or more nitrogen atoms, the point of attachment can be a carbon or nitrogen atom, as valency permits. Heteroaryl polycyclic ring systems can include one or more heteroatoms in one or both rings. "Heteroaryl" includes ring systems wherein the heteroaryl ring, as defined above, is fused with one or more carbocyclyl or heterocyclyl groups wherein the point of attachment is on the heteroaryl ring, and in such instances, the number of ring members continue to designate the number of ring members in the heteroaryl ring system. "Heteroaryl" also includes ring systems wherein the heteroaryl ring, as defined above, is fused with one or more aryl groups wherein the point of attachment is either on the aryl or heteroaryl ring, and in such instances, the number of ring members designates the number of ring members in the fused polycyclic (aryl/heteroaryl) ring system. Polycyclic heteroaryl groups wherein one ring does not contain a heteroatom (e.g., indolyl, quinolinyl, carbazolyl, and the like) the point of attachment can be on either ring, i.e., either the ring bearing a heteroatom (e.g., 2-indolyl) or the ring that does not contain a heteroatom (e.g., 5-indolyl).

In some embodiments, a heteroaryl group is a 5-10 membered aromatic ring system having ring carbon atoms and 1-4 ring heteroatoms provided in the aromatic ring system, wherein each heteroatom is independently selected from nitrogen, oxygen, and sulfur ("5-10 membered heteroaryl"). In some embodiments, a heteroaryl group is a 5-8 membered aromatic ring system having ring carbon atoms and 1-4 ring heteroatoms provided in the aromatic ring system, wherein each heteroatom is independently selected from nitrogen, oxygen, and sulfur ("5-8 membered heteroaryl"). In some embodiments, a heteroaryl group is a 5-6 membered aromatic ring system having ring carbon atoms and 1-4 ring heteroatoms provided in the aromatic ring system, wherein each heteroatom is independently selected from nitrogen, oxygen, and sulfur ("5-6 membered heteroaryl"). In some embodiments, the 5-6 membered heteroaryl has 1-3 ring heteroatoms selected from nitrogen, oxygen, and sulfur. In some embodiments, the 5-6 membered heteroaryl has 1-2 ring heteroatoms selected from nitrogen, oxygen, and sulfur. In some embodiments, the 5-6 membered heteroaryl has 1 ring heteroatom selected from nitrogen, oxygen, and sulfur. Unless otherwise specified, each instance of a heteroaryl group is independently unsubstituted (an "unsubstituted heteroaryl") or substituted (a "substituted heteroaryl") with one or more substituents. In certain embodiments, the heteroaryl group is an unsubstituted 5-14 membered heteroaryl. In certain embodiments, the heteroaryl group is a substituted 5-14 membered heteroaryl.

Exemplary 5-membered heteroaryl groups containing 1 heteroatom include, without limitation, pyrrolyl, furanyl and thiophenyl. Exemplary 5-membered heteroaryl groups containing 2 heteroatoms include, without limitation, imidazolyl, pyrazolyl, oxazolyl, isoxazolyl, thiazolyl, and isothiazolyl. Exemplary 5-membered heteroaryl groups containing 3 heteroatoms include, without limitation, triazolyl, oxadiazolyl, and thiadiazolyl. Exemplary 5-membered heteroaryl groups containing 4 heteroatoms include, without limitation, tetrazolyl.

Exemplary 6-membered heteroaryl groups containing 1 heteroatom include, without limitation, pyridinyl. Exemplary 6-membered heteroaryl groups containing 2 heteroatoms include, without limitation, pyridazinyl, pyrimidinyl, and pyrazinyl.

Exemplary 6-membered heteroaryl groups containing 3 or 4 heteroatoms include, without limitation, triazinyl and tetrazinyl, respectively.

Exemplary 7-membered heteroaryl groups containing 1 heteroatom include, without limitation, azepinyl, oxepinyl, and thiepinyl. Exemplary 5,6-bicyclic heteroaryl groups include, without limitation, indolyl, isoindolyl, indazolyl, benzotriazolyl, benzothiophenyl, isobenzothiophenyl, benzofuranyl, benzoisofuranyl, benzimidazolyl, benzoxazolyl, benzisoxazolyl, benzoxadiazolyl, benzthiazolyl, benzisothiazolyl, benzthiadiazolyl, indolizinyl, and purinyl.

Exemplary 6,6-bicyclic heteroaryl groups include, without limitation, naphthyridinyl, pteridinyl, quinolinyl, isoquinolinyl, cinnolinyl, quinoxalinyl, phthalazinyl, and quinazolinyl. Exemplary tricyclic heteroaryl groups include, without limitation, phenanthridinyl, dibenzofuranyl, carbazolyl, acridinyl, phenothiazinyl, phenoxazinyl and phenazinyl.

As understood from the above, alkyl, alkenyl, alkynyl, heteroalkyl, heteroalkenyl, heteroalkynyl, carbocyclyl, heterocyclyl, aryl, and heteroaryl groups, as defined herein, are, in certain embodiments, optionally substituted. Optionally substituted refers to a group which may be substituted or unsubstituted (e.g., "substituted" or "unsubstituted" alkyl, "substituted" or "unsubstituted" alkenyl, "substituted" or "unsubstituted" alkynyl, "substituted" or "unsubstituted" heteroalkyl, "substituted" or "unsubstituted" heteroalkenyl, "substituted" or "unsubstituted" heteroalkynyl, "substituted" or "unsubstituted" carbocyclyl, "substituted" or "unsubstituted" heterocyclyl, "substituted" or "unsubstituted" aryl or "substituted" or "unsubstituted" heteroaryl group). In general, the term "substituted" means that at least one hydrogen present on a group is replaced with a permissible substituent, e.g., a substituent which upon substitution results in a stable compound, e.g., a compound which does not spontaneously undergo transformation such as by rearrangement, cyclization, elimination, or other reaction.

Unless otherwise indicated, a "substituted" group has a substituent at one or more substitutable positions of the group, and when more than one position in any given structure is substituted, the substituent is either the same or different at each position. The term "substituted" is contemplated to include substitution with all permissible substituents of organic compounds, and includes any of the substituents described herein that results in the formation of a stable compound. The present invention contemplates any and all such combinations in order to arrive at a stable compound. Heteroatoms such as nitrogen may have hydrogen substituents and/or any suitable substituent as described herein which satisfy the valencies of the heteroatoms and results in the formation of a stable moiety.

As used herein, the term "halo" or "halogen" refers to fluorine (fluoro, —F), chlorine (chloro, —Cl), bromine (bromo, —Br), or iodine (iodo, —I).

As used herein, the term "hydroxyl" or "hydroxy" refers to the group —OH. The term "substituted hydroxyl" or "substituted hydroxyl" refers to a hydroxyl group wherein the oxygen atom directly attached to the parent molecule is substituted with a group other than hydrogen.

As used herein, the term "thiol" or "thio" refers to the group —SH. The term "substituted thiol" or "substituted thio," by extension, refers to a thiol group wherein the sulfur atom directly attached to the parent molecule is substituted with a group other than hydrogen.

As used herein, the term, "amino" refers to the group —NH$_2$. The term "substituted amino," by extension, refers to a monosubstituted amino, a disubstituted amino, or a trisubstituted amino, as defined herein. In certain embodiments, the "substituted amino" is a monosubstituted amino or a disubstituted amino group.

As used herein, the term "carbonyl" refers a group wherein the carbon directly attached to the parent molecule is sp$^2$ hybridized, and is substituted with an oxygen, nitrogen or sulfur atom.

The following examples are intended to illustrate certain embodiments of the present invention, but do not exemplify the full scope of the invention.

Example 1

The following example describes the synthesis of silyl-ether acrylate crosslinking moieties and subsequent photocuring to provide silyl-ether acrylate polymers.

Figure 1B:
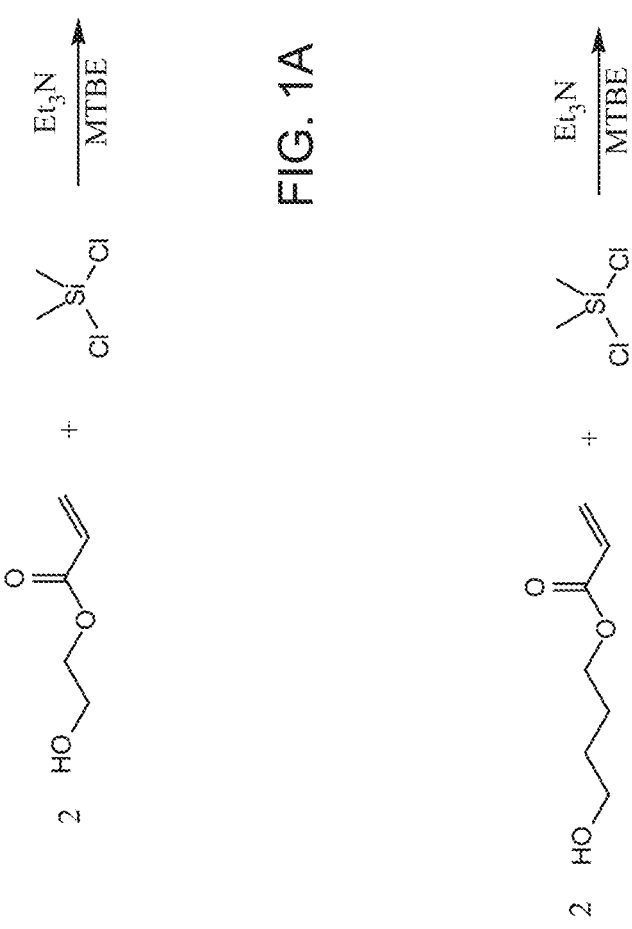
FIG. 1B shows, according to certain embodiments, a synthetic scheme to produce bis-oxybutylacrylate dimethylsilane.

Bis-oxyethylacrylate dimethylsilane, as shown in FIG. 1A, and bis-oxybutylacrylate dimethylsilane, as shown in FIG. 1B, were designed and synthesized. Both materials were prepared in a single step reaction on a large scale (e.g., 50 grams) by reacting acrylate alcohols with commercially available chlorosilanes, thereby providing a simple and chemically efficient means to synthesize precursors that contain the labile crosslinking moieties. The scalability and commercial availability of reagents are key attributes this system. Each of the monomer precursors were formulated and photocured to provide separate respective polymers.

Example 2

The following example describes exposing a structurally self-supporting material to H$_2$O to convert the structurally self-supporting material to a non-structurally self-supporting material.

Figure 2:
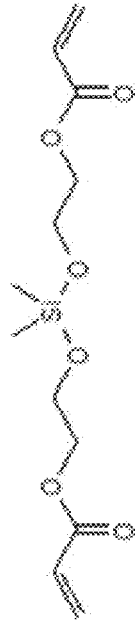
FIG. 2 shows, according to certain embodiments, photographs of a photopolymerized plug of bis-oxyethylacrylate dimethylsilane (top) and a photopolymerized plug of bis-oxyethylacrylate dimethylsilane immersed in water (bottom)
Figure 2:
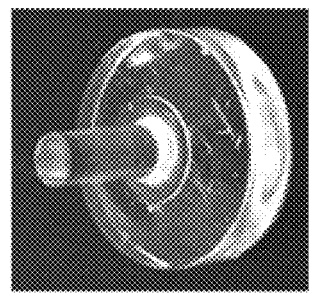
Figure 2:
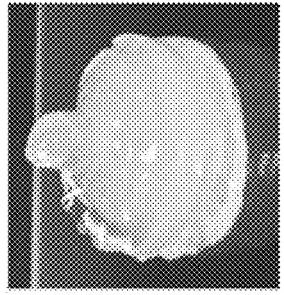

The bis-oxyethylacrylate dimethylsilane was photopolmyerized to provide a heavily crosslinked rigid plug (FIG. 2, top). The rigid plug was immersed in warm water overnight to provide a soft plug partially swollen with water (FIG. 2, bottom).

Figure 3:
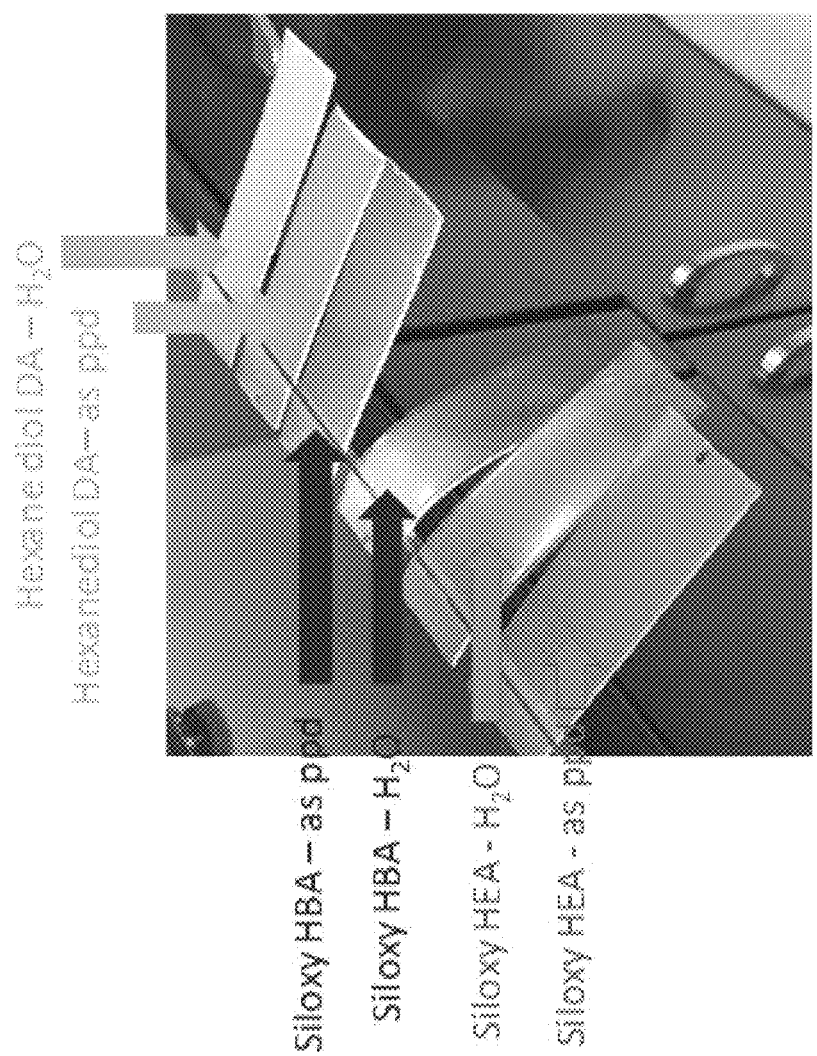
FIG. 3 shows, according to certain embodiments, a photograph of sheets of bis-oxyethylacrylate dimethylsilane, bis-oxybutylacrylate dimethylsilane, and hexanedioldiacrylate as prepared and as exposed to water.

The immersion process was repeated for sheets of three various polymer formulations (see FIG. 3). Two polymer formulations with hydrolytically labile crosslinking moieties, bis-oxyethylacrylate dimethylsilane or siloxy HEA and bis-oxybutylacrylate dimethylsilane or siloxy HBA, were synthesized and evaluated. A negative control without a hydrolytically labile crosslinking moiety, hexanedioldiacrylate or hexane diol DA, was also synthesized and evaluated. All three formulations were rigid as prepared (ppd) by high resolution additive manufacturing processes. After immersion of all three formulations in warm water, the two formulations with labile crosslinkers (siloxy HEA-H$_2$O and siloxy HBA-H$_2$O) were softer, resulting in a bend under their own weight. The negative control with hexane diol DA showed no change in rigidity after immersion in warm water.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method comprising:
providing a structurally self-supporting material comprising a polymeric material, wherein the polymeric material comprises a silyl-ether triacrylate polymer of the partial structure:

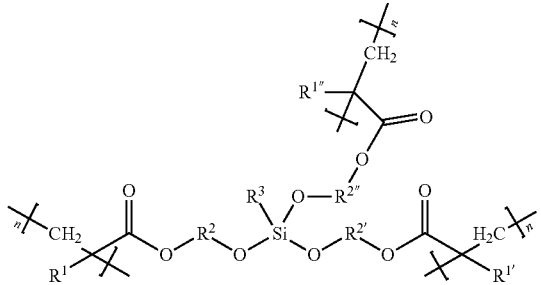

wherein:
any of $R^1$, $R^{1\prime}$, and $R^{1\prime\prime}$ are the same or different and are selected from the group consisting of —H, —CH$_3$, C$_{1-10}$ alkyl, heteroalkyl, alkenyl, heteroalkenyl, alkynyl, heteroalkynyl, acyl, carbocyclyl, heterocyclyl, aryl, heteroaryl, halo, hydroxyl, thiol, amino, carbonyl, and combinations thereof;

any of $R^2$, $R^{2\prime}$, and $R^{2\prime\prime}$ are the same or different and are selected from the group consisting of C$_{1-10}$ alkyl, heteroalkyl, alkenyl, heteroalkenyl, alkynyl, heteroalkynyl acyl, carbocyclyl, heterocyclyl, aryl, heteroaryl, and combinations thereof;

$R^3$ is selected from the group consisting of —H, —CH$_3$, C$_{1-10}$ alkyl, heteroalkyl, alkenyl, heteroalkenyl, alkynyl, heteroalkynyl, acyl, carbocyclyl, heterocyclyl, aryl, heteroaryl, halo, hydroxyl, thiol, amino, and combinations thereof; and n is greater than or equal to 2; and exposing at least a portion of the structurally self-supporting material to H$_2$O, and converting at least a portion of the structurally self-supporting material to a non-structurally self-supporting material.

2. The method of claim 1, wherein providing the structurally self-supporting material comprises providing the structurally self-supporting material on a substrate.

3. The method of claim 2, wherein providing the structurally self-supporting material comprises three-dimensional (3D) printing the structurally self-supporting material on the substrate.

4. The method of claim 1, wherein reacting at least a portion of the polymeric material comprises hydrolyzing at least a portion of the polymeric material.

5. The method of claim 1, wherein the structurally self-supporting material has a Young's modulus between greater than or equal to 1 GPa and less than or equal to 5 GPa.

6. The method of claim 1, wherein the non-structurally self-supporting material has a Young's modulus between less than or equal to 1 GPa and greater than or equal to 0.01 GPa.

7. The method of claim 1, wherein exposing at least a portion of the structurally self-supporting material to $H_2O$ comprises at least partially submerging the structurally self-supporting material in water.

8. The method of claim 1, wherein exposing at least a portion of the structurally self-supporting material to $H_2O$ comprises exposing the structurally self-supporting material to moisture.

9. The method of claim 1, wherein exposing at least a portion of the structurally self-supporting material to $H_2O$ comprises exposing at least a portion of the structurally self-supporting material to $H_2O$ for an amount of time greater than or equal to 0.5 hours and less than or equal to 72 hours.

10. The method of claim 9, wherein the Young's modulus of the non-structurally self-supporting material is inversely proportional to the amount of time that the structurally self-supporting material is exposed to $H_2O$.

11. The method of claim 1, wherein exposing at least a portion of the structurally self-supporting material to $H_2O$ comprises exposing at least a portion of the structurally self-supporting material to $H_2O$ at a temperature greater than or equal to 25° C. and less than or equal to 150° C.

12. The method of claim 11, wherein the Young's modulus of the non-structurally self-supporting material is inversely proportional to the temperature at which that the structurally self-supporting material is exposed to $H_2O$.

13. A method comprising:
providing a structurally self-supporting material comprising a polymeric material, wherein the polymeric material comprises a silyl-ether tetraacrylate polymer of the partial structure:

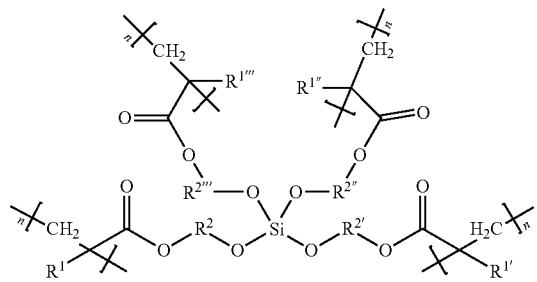

wherein:
any of $R^1$, $R^{1'}$, $R^{1''}$, and $R^{1'''}$ are the same or different and are selected from the group consisting of —H, —CH₃, $C_{1-10}$ alkyl, heteroalkyl, alkenyl, heteroalkenyl, alkynyl, heteroalkynyl, acyl, carbocyclyl, heterocyclyl, aryl, heteroaryl, halo, hydroxyl, thiol, amino, carbonyl, and combinations thereof;

any of $R^2$, $R^{2'}$, $R^{2''}$, and $R^{2'''}$ are the same or different and are selected from the group consisting of $C_{1-10}$ alkyl, heteroalkyl, alkenyl, heteroalkenyl, alkynyl, heteroalkynyl acyl, carbocyclyl, heterocyclyl, aryl, heteroaryl, and combinations thereof; and n is greater than or equal to 2; and exposing at least a portion of the structurally self-supporting material to $H_2O$, thereby reacting at least a portion of the polymeric material and converting at least a portion of the structurally self-supporting material to a non-structurally self-supporting material.

14. A method comprising:
providing a structurally self-supporting material comprising a polymeric material, wherein the polymeric material comprises a thioether of the partial structure:

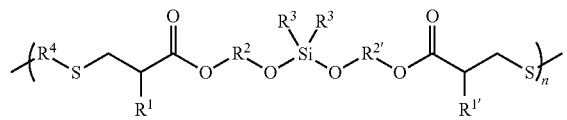

wherein:
$R^1$ and $R^{1'}$ are the same or different and are selected from the group consisting of —H, —CH₃, $C_{1-10}$ alkyl, heteroalkyl, alkenyl, heteroalkenyl, alkynyl, heteroalkynyl, acyl, carbocyclyl, heterocyclyl, aryl, heteroaryl, halo, hydroxyl, thiol, amino, carbonyl, and combinations thereof;

$R^2$ and $R^{2'}$ are the same or different and are selected from the group consisting of $C_{1-10}$ alkyl, heteroalkyl, alkenyl, heteroalkenyl, alkynyl, heteroalkynyl acyl, carbocyclyl, heterocyclyl, aryl, heteroaryl, and combinations thereof;

$R^3$ and $R^{3'}$ are the same or different and are selected from the group consisting of —H, —CH₃, $C_{1-10}$ alkyl, heteroalkyl, alkenyl, heteroalkenyl, alkynyl, heteroalkynyl, acyl, carbocyclyl, heterocyclyl, aryl, heteroaryl, halo, hydroxyl, thiol, amino, and combinations thereof;

$R^4$ is selected from the group consisting of —CH₃, $C_{1-10}$ alkyl, heteroalkyl, alkenyl, heteroalkenyl, alkynyl, heteroalkynyl, acyl, carbocyclyl, heterocyclyl, aryl, heteroaryl, halo, hydroxyl, amino, carbonyl, thiol-containing derivatives thereof, and combinations thereof; and n is greater than or equal to 2; and exposing at least a portion of the structurally self-supporting material to $H_2O$, thereby reacting at least a portion of the polymeric material and converting at least a portion of the structurally self-supporting material to a non-structurally self-supporting material.

* * * * *